(12) United States Patent
Mishra et al.

(10) Patent No.: US 10,204,135 B2
(45) Date of Patent: Feb. 12, 2019

(54) MATERIALIZING EXPRESSIONS WITHIN IN-MEMORY VIRTUAL COLUMN UNITS TO ACCELERATE ANALYTIC QUERIES

(71) Applicant: Oracle International Corporation, Redwood Shores, CA (US)

(72) Inventors: Aurosish Mishra, Belmont, CA (US); Shasank K. Chavan, Menlo Park, CA (US); Allison L. Holloway, San Carlos, CA (US); Jesse Kamp, Castro Valley, CA (US); Ramesh Kumar, Foster City, CA (US); Zhen Hua Liu, San Mateo, CA (US); Niloy Mukherjee, Belmont, CA (US); Amit Ganesh, San Jose, CA (US); Tirthankar Lahiri, Palo Alto, CA (US); Vineet Marwah, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 320 days.

(21) Appl. No.: 15/146,799

(22) Filed: May 4, 2016

(65) Prior Publication Data
US 2017/0031975 A1   Feb. 2, 2017

Related U.S. Application Data

(60) Provisional application No. 62/245,959, filed on Oct. 23, 2015, provisional application No. 62/198,572, filed on Jul. 29, 2015.

(51) Int. Cl.
*G06F 17/30* (2006.01)

(52) U.S. Cl.
CPC .... *G06F 17/30383* (2013.01); *G06F 17/3046* (2013.01); *G06F 17/30339* (2013.01); *G06F 17/30477* (2013.01)

(58) Field of Classification Search
CPC ......... G06F 17/30383; G06F 17/30339; G06F 17/3046; G06F 17/30477
(Continued)

(56) References Cited

U.S. PATENT DOCUMENTS

| 4,815,030 A | 3/1989 | Cross et al. |
| 5,072,405 A | 12/1991 | Ramakrisha et al. |

(Continued)

FOREIGN PATENT DOCUMENTS

| EP | 0743596 A2 | 11/1996 |
| EP | 0 959 416 A2 | 11/1999 |

(Continued)

OTHER PUBLICATIONS

"22 SQL Access Using RESOURCE_VIEW and PATH_VIEW" Oracle® XML DB Developer's Guide 10g Release 2 (10.2) downloaded from the Internet on Jul. 15, 2009.
(Continued)

*Primary Examiner* — Hares Jami
(74) *Attorney, Agent, or Firm* — Hickman Palermo Becker Bingham LLP

(57) ABSTRACT

Techniques are described for materializing pre-computed results of expressions. In an embodiment, a set of one or more column units are stored in volatile or non-volatile memory. Each column unit corresponds to a column that belongs to an on-disk table within a database managed by a database server instance and includes data items from the corresponding column. A set of one or more virtual column units, and data that associates the set of one or more column units with the set of one or more virtual column units, are also stored in memory. The set of one or more virtual column units includes a particular virtual column unit storing results that are derived by evaluating an expression on at least one column of the on-disk table.

17 Claims, 7 Drawing Sheets

(58) Field of Classification Search
USPC .................................. 707/705, 713, 717, 722
See application file for complete search history.

(56) References Cited

U.S. PATENT DOCUMENTS

| | | |
|---|---|---|
| 5,325,292 A | 6/1994 | Crockett |
| 5,446,885 A | 8/1995 | Moore et al. |
| 5,625,820 A | 4/1997 | Hermsmeier et al. |
| 5,680,602 A | 10/1997 | Bloem et al. |
| 5,778,350 A | 7/1998 | Adams et al. |
| 5,819,255 A | 10/1998 | Celis |
| 5,870,552 A | 2/1999 | Dozier et al. |
| 5,873,075 A | 2/1999 | Cochrane et al. |
| 5,873,084 A | 2/1999 | Brancho et al. |
| 5,873,091 A | 2/1999 | Garth et al. |
| 5,899,986 A | 5/1999 | Ziauddin |
| 5,940,832 A | 8/1999 | Hamada et al. |
| 5,970,244 A | 10/1999 | Nagahashi et al. |
| 5,991,733 A | 11/1999 | Aleia et al. |
| 6,003,022 A | 12/1999 | Eberhard et al. |
| 6,021,443 A | 2/2000 | Bracho et al. |
| 6,035,306 A | 3/2000 | Lowenthal et al. |
| 6,038,601 A | 3/2000 | Lambert et al. |
| 6,067,540 A | 5/2000 | Ozbutun et al. |
| 6,070,160 A | 5/2000 | Geary |
| 6,085,191 A | 7/2000 | Fisher et al. |
| 6,115,703 A | 9/2000 | Bireley |
| 6,122,639 A | 9/2000 | Babu et al. |
| 6,122,664 A | 9/2000 | Boukobza et al. |
| 6,173,154 B1 | 1/2001 | Kucinski et al. |
| 6,189,022 B1 | 2/2001 | Binns |
| 6,195,676 B1 | 2/2001 | Spix et al. |
| 6,223,171 B1 | 4/2001 | Chaudhuri et al. |
| 6,285,997 B1 | 9/2001 | Carey et al. |
| 6,321,218 B1 | 11/2001 | Guay et al. |
| 6,353,828 B1 * | 3/2002 | Ganesh ............ G06F 17/30362 |
| 6,356,886 B1 | 3/2002 | Goossens et al. |
| 6,370,552 B1 | 4/2002 | Agarwal et al. |
| 6,377,943 B1 | 4/2002 | Jakobsson |
| 6,389,430 B1 | 5/2002 | Parker |
| 6,401,090 B1 | 6/2002 | Bailis et al. |
| 6,405,191 B1 | 6/2002 | Bhatt et al. |
| 6,427,146 B1 | 7/2002 | Chu |
| 6,442,568 B1 | 8/2002 | Velasco et al. |
| 6,470,330 B1 | 10/2002 | Das et al. |
| 6,502,093 B1 | 12/2002 | Bhatt et al. |
| 6,519,580 B1 | 2/2003 | Johnson et al. |
| 6,539,371 B1 | 3/2003 | Bleizeffer et al. |
| 6,553,369 B1 | 4/2003 | Guay et al. |
| 6,564,207 B1 | 5/2003 | Abdoh |
| 6,604,093 B1 | 8/2003 | Etzion et al. |
| 6,604,100 B1 | 8/2003 | Fernandez et al. |
| 6,665,684 B2 | 12/2003 | Zait et al. |
| 6,681,383 B1 | 1/2004 | Pastor et al. |
| 6,691,155 B2 | 2/2004 | Gottfried |
| 6,757,675 B2 | 6/2004 | Aiken et al. |
| 6,766,318 B1 | 7/2004 | Guay et al. |
| 6,850,893 B2 | 2/2005 | Lipkin et al. |
| 6,865,567 B1 | 3/2005 | Commen |
| 6,901,410 B2 | 5/2005 | Marron et al. |
| 6,917,946 B2 | 7/2005 | Corl, Jr. et al. |
| 7,092,954 B1 | 8/2006 | Ramesh |
| 7,127,467 B2 | 10/2006 | Yalamanchi et al. |
| 7,480,302 B2 | 1/2009 | Choi |
| 7,512,589 B2 | 3/2009 | Stokkan et al. |
| 7,636,731 B2 | 12/2009 | Curanes et al. |
| 9,183,254 B1 | 11/2015 | Cole |
| 9,659,045 B2 | 5/2017 | Liu et al. |
| 2001/0047270 A1 | 11/2001 | Gusick et al. |
| 2002/0062475 A1 | 5/2002 | Iborra et al. |
| 2002/0152149 A1 | 10/2002 | Tanaka |
| 2003/0046421 A1 | 3/2003 | Horvitz et al. |
| 2003/0097365 A1 | 5/2003 | Stickler |
| 2003/0120642 A1 | 6/2003 | Egilsson et al. |
| 2003/0182268 A1 | 9/2003 | Lal |
| 2003/0187858 A1 | 10/2003 | Kirk |
| 2003/0187862 A1 * | 10/2003 | Brobst ................ G06F 17/30 |
| 2003/0236834 A1 | 12/2003 | Gottfried |
| 2004/0181543 A1 | 9/2004 | Wu et al. |
| 2004/0193575 A1 | 9/2004 | Chen et al. |
| 2005/0203940 A1 | 9/2005 | Farrar et al. |
| 2005/0222978 A1 | 10/2005 | Drory et al. |
| 2005/0283458 A1 | 12/2005 | Galindo-Legaria |
| 2006/0047696 A1 * | 3/2006 | Larson ............ G06F 17/30457 |
| 2006/0083227 A1 | 4/2006 | Eldar |
| 2006/0085592 A1 | 4/2006 | Ganguly et al. |
| 2006/0195437 A1 | 8/2006 | Dietel |
| 2006/0230017 A1 * | 10/2006 | Larson ............ G06F 17/30457 |
| 2006/0242694 A1 | 10/2006 | Gold et al. |
| 2006/0288026 A1 | 12/2006 | Zayas et al. |
| 2006/0288030 A1 | 12/2006 | Lawrence |
| 2007/0043757 A1 | 2/2007 | Benton et al. |
| 2007/0112736 A1 | 5/2007 | Okamoto et al. |
| 2007/0179934 A1 | 8/2007 | Basov et al. |
| 2007/0226237 A1 | 9/2007 | Gong et al. |
| 2008/0059412 A1 * | 3/2008 | Tarin ................ G06F 17/30592 |
| 2008/0120274 A1 | 5/2008 | Curanes et al. |
| 2008/0120275 A1 | 5/2008 | Cruanes et al. |
| 2008/0177722 A1 * | 7/2008 | Lohman ............ G06F 17/30979 |
| 2008/0281801 A1 | 11/2008 | Larson et al. |
| 2009/0150366 A1 * | 6/2009 | Basu ................ G06F 17/30312 |
| 2011/0106843 A1 * | 5/2011 | Pan ................ G06F 17/30457 |
| | | 707/769 |
| 2011/0264687 A1 | 10/2011 | Surtani |
| 2014/0195503 A1 | 7/2014 | Kao |
| 2016/0179836 A1 * | 6/2016 | Guo ................ G06F 17/30117 |
| | | 707/692 |

FOREIGN PATENT DOCUMENTS

| | | |
|---|---|---|
| GB | 2 274 182 A | 7/1994 |
| GB | 2 354 847 A | 4/2001 |
| GB | 2 354 848 A | 4/2001 |
| JP | 05089143 | 4/1993 |
| JP | 06319024 | 11/1994 |
| WO | WO 98/33131 A1 | 7/1998 |
| WO | WO 01/08048 A1 | 2/2001 |
| WO | WO 01/88795 A1 | 11/2001 |
| WO | WO 03098479 A | 5/2003 |

OTHER PUBLICATIONS

M.F. Wyle, "A Wide Area Network Information Filter," Proceedings International Conference on Artificial Intelligence Applications on Wall Street, Oct. 9, 1991, New York, US, Los Alamitos, CA Oct. 9, 1991, XP000534152, pp. 10-15.

Jim Binkley, et al: "Rama: An Architecture for Internet Information Filtering," Journal of Intelligent Information Systems, vol. 5, No. 2, Sep. 1, 1995 (Sep. 1, 1995), XP000617268, pp. 81-99.

Patrick A. O'Donnell, et al., "Deadlock-Free and Collision-Free Coordination of Two Robot Manipulators," 1989, IEEE, XP000041486, pp. 484-489.

Clara Nippl, et al., "Accelerating Profiling Services by Parallel Database Technology," undated, 9 pages.

Norman W. Paton, et al., "Active Database Systems," Mar. 1999, ACM Computing Surveys, vol. 31, No. 1., pp. 63-103.

Gianluigi Greco et al., Event Choice Datalog: A Logic Programming Language for Reasoning in Multiple Dimensions, dated 2004, ACM Press, pp. 238-249.

Poess, Meikel, et al., "New TPC Benchmarks for Decision Support and Web Commerce", ACM Press, retrieved from website: < http://www.sigmod.org/record/issues/0012/standards.pdf >, published Dec. 2000, 8 pages.

Selinger, P. Griffiths, et al., "Access Path Selection in a Relational Database Management System", ACM Inc., Proceedings of the 1979 ACM SIGMOD International Conference on the Management of Data, dated Oct. 2002, pp. 23-34.

Cyran, Michele, et al., "Oracle® Database Concepts", Oracle, 10g Release 2 (10.2), dated Oct. 2005, 16 pages.

(56) References Cited

OTHER PUBLICATIONS publib.boulder.ibm.com, "Collecting statistics on a sample of the table data", DB2 Version 9 for Linux, UNIX, and Windows, retrieved from website: http://publib.boulder.ibm.com/infocenter/db2luw/v9/index.jsp?topic=/com.ibm.db2.udb.admin.doc/doc/c0011393.htm >, last updated Oct. 27, 2006, 1 page.
publib.boulder.ibm.com, "RUNSTATS command", DB2 Version 9 for Linux, UNIX, and Windows, Retrieved from website: http://publib.boulder.ibm.com/infocenter/db2luw/v8/index.jsp?topic=/com.ibm.db2.udb.doc/core/r0001980.htm, last updated Oct. 27, 2006, 8 pages.
Microsoft, "SQL Server Query Optimization and Tuning", Microsoft TechNet, Retrieved from website: < http://www.microsoft.com/technet/community/chats/trans/sql/sql0909.mspx >, Published Sep. 9, 2003, 7 pages.
Hanson, Eric N., et al., "Statistics Used by the Query Optimizer in Microsoft SQL Server 2005", Microsoft TechNet, retrieved from website: < http://www.microsoft.com/technet/prodtechnol/sql/2005/qrystats.mspx >, printed Mar. 27, 2007, 13 pages.
Gibbons, Phillip B., et al., "Distinct Sampling for Highly-Accurate Answers to Distinct Values Queries and Event Reports", Proceedings of the 27$^{th}$ VLDB Conference, 2001, 10 pages.
Othayoth, Raghunath, et al., "The Making of TPC-DS", Copyright 2006 VLDB Endowment, ACM, retrieved from website: < http://www.vldb.org/conf/2006/p1049-othayoth.pdf >, 10 pages.
Segev, A. et al., "Rule Activation Techniques in Active Database Systems", Journal of Intelligent Information Systems, 7(2):173-194, Oct. 1996, 23 pages.
IBM Corp., "Improved Rete Algorithm — Hashing Techniques Applied to Partial Match Memories," IBM Technical Disclosure Bulletin, vol. 35, No. 3, Aug. 1992, p. 149.
Charles L. Forgy, "Rete: A Fast Algorithm for the Many Pattern/Many Object Pattern Match Problem," *Artificial Intelligence*, 1982, pp. 17-37.
Marcos K. Aguilera, et al., "Matching Events in a Content-based Subscription System," 1999, Symposium on Principles of Distributed Computing, 9 pages.
Umeshwar Dayal, et al., "Active Database Systems," *Modern Database Systems: The Object Model, Interoperability, and Beyond*, Addison-Wesley, Reading, Massachusetts, Sep. 1994, 25 pages.
Jagannathan Srinivasan, et al., "Extensible Indexing: A Framework for Integrating Domain-Specific Indexing Schemes Into Oracle8i," Oracle Corporation, 16$^{th}$ International Conference on Data Engineering, Feb. 28-Mar. 3, 2000, San Diego, California, 10 pages.

Patrick O'Neil, et al., "Improved Query Performance with Variant Indexes," SIGMOD '97 May 97, Tucson, Arizona, USA, pp. 1-12.
Eric N. Hanson, et al., "Optimized Rule Condition Testing in Ariel using Gator Networks," Oct. 23, 1995, University of Florida, TR-95-027, pp. 1-24.
Grosof, Benjamin N. et al., "Sweet Deal: Representing Agent Contracts with Exceptions using XML Rules. Ontologies, and Process Descriptions," XP002354519, pp. 340-348.
Bea, :Using Expressions and Conditions, WebLogic Process Integrator Release 1.1, 2000, located on the internet at <http://e-docs.bea.com/wlpi/wlpi11/studio/ch6.htm>, retrieved on Dec. 29, 2005, 12 pages.
Chamberlain, Don, "Query Languages and XML," PowerPoint Presentation, IBM Almaden Research Center, Dec. 2000, located on the internet at <http://www-db.sc.wisc.edu/dbseminar/fall00/talks/chamberlain>, 26 pages.
Chamberlain, Don et al., "XQuery: A Query Language for XML," W3C Working Draft, Feb. 15, 2001, located on the internet at <http://www.w3.org/TR/2001/WD-xquery-20010215/>, retrieved on Dec. 29, 2005, 83 pages.
Clark, James et al., "XML PATH Language (XPath), Version 1.0," W3C, 1999, located on the internet at <http://www.w3.org/TR/xpath.html>, retrieved on Dec. 29, 2005, 37 pages.
Krishnaprasad, Muralidhar et al., "Query Rewrite in Oracle XML DB," Proceeding of the 30th VLDB Conference, 2004, pp. 1134-1145.
Unknown Author, unknown title, located on the internet at <www.cs.uku.fi/kilpelai/RDK01/lectures/Xquery.pdf>. 2001. 10 pages.
Kei Kurakawa et al., "Life Cycle Design Support Based on Environmental Information Sharing," IEEE, Feb. 1-3, 1999, Proceedings EcoDesign '99, First International Symposium, pp. 138-142.
Oliver Gunther, et al., "MMM: A Web-Based System for Sharing Statistical Computing Modules," IEEE, May-Jun. 1997, vol. 1, Issue 3, pp. 59-68.
Zhou et al., "Efficient Exploitation of Similar Subexpression for Query Processing", Acm Sigmond, dated Jan. 1, 2007, 12 pages.
Milena G Ivanova et al., "An Architecture for Recycling Intermediates in a Column-Store", SIGMOD-PODS, dated Jun. 29, 2009, 12 pages.
Chavan, U.S. Appl. No. 15/146,801, filed May 4, 2016, Office Action, dated May 17, 2018.
Chavan, U.S. Appl. No. 15/146,801, filed May 4, 2016, Final Office Action dated Nov. 21, 2018.
Chavan, U.S. Appl. No. 15/146,798, filed May 4, 2016, Office Action Oct. 19, 2018.

\* cited by examiner

MATERIALIZING EXPRESSIONS WITHIN IN-MEMORY VIRTUAL COLUMN UNITS TO ACCELERATE ANALYTIC QUERIES

CROSS-REFERENCE TO RELATED APPLICATIONS

This application claims the benefit of Provisional Appln. 62/198,572, filed Jul. 29, 2015, and Provisional Appln. 62/245,959, filed Oct. 23, 2015, the entire contents for both of which are hereby incorporated by reference as if fully set forth herein, under 35 U.S.C. § 119(e).

This application is related to:
application Ser. No. 15/146,798 entitled "TRACKING AND MAINTAINING EXPRESSION STATISTICS ACROSS DATABASE QUERIES",filed May 4, 2016,
application Ser. No. 15/146,801 entitled "MATERIALIZING INTERNAL COMPUTATIONS IN-MEMORY TO IMPROVE QUERY PERFORMANCE", filed May 4, 2016, and
application Ser. No. 14/337,179, entitled "MIRRORING, IN MEMORY, DATA FROM DISK TO IMPROVE QUERY PERFORMANCE", filed Jul. 21, 2014,
the entire contents for each of which are hereby incorporated by reference as if fully set forth herein.

FIELD OF THE DISCLOSURE

The present disclosure relates to storing and maintaining evaluation results for expressions and internal computations within in-memory storage units.

BACKGROUND

Database queries include constructs referred to as expressions, where an expression is typically a combination of one or more values, operators, and/or functions. During query execution, a database server instance evaluates the query expressions to produce a query result. Query expressions may cause a database server instance to perform a variety of operations such as filtering, projecting, aggregating, sorting, or otherwise manipulating values stored within a database object. Some query expressions require process-intensive operations that consume a significant amount of resources per evaluation. In some cases, these expressions appear across multiple queries or multiple parts of the same query. When these expressions are evaluated over large datasets repeatedly, the performance of a database server instance may be significantly impacted.

One approach that database administrators use to optimize execution of computationally-expensive queries is to create materialized views. A materialized view is a database object that contains the results of a query. For example, a materialized view may capture the final result of two tables joined together. Once the materialized view is created, subsequent queries may be rewritten to access the materialized view rather than performing another table join operation. Thus, materialized views obviate the need for multiple executions of queries that may require significant time to compute.

While materialized views are useful for capturing the final results of a query, materialized views do not capture data that tracks the usage of individual expressions within the query. Further, materialized views do not capture intermediary expression results that reside solely in memory during query execution. For example, a hash join operation computes hash values from a join attribute to determine which records to join from two different tables. A materialized view may store the combined records representing the final result of the join operation. However, the materialized view does not capture data relating to the hash operation since the resultant hash values are not part of the final query result and are not persistently stored within the database. Similarly, the results of other expression evaluations and internal computations that reside only in memory during query execution are not typically captured by a database server.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Figure 1:
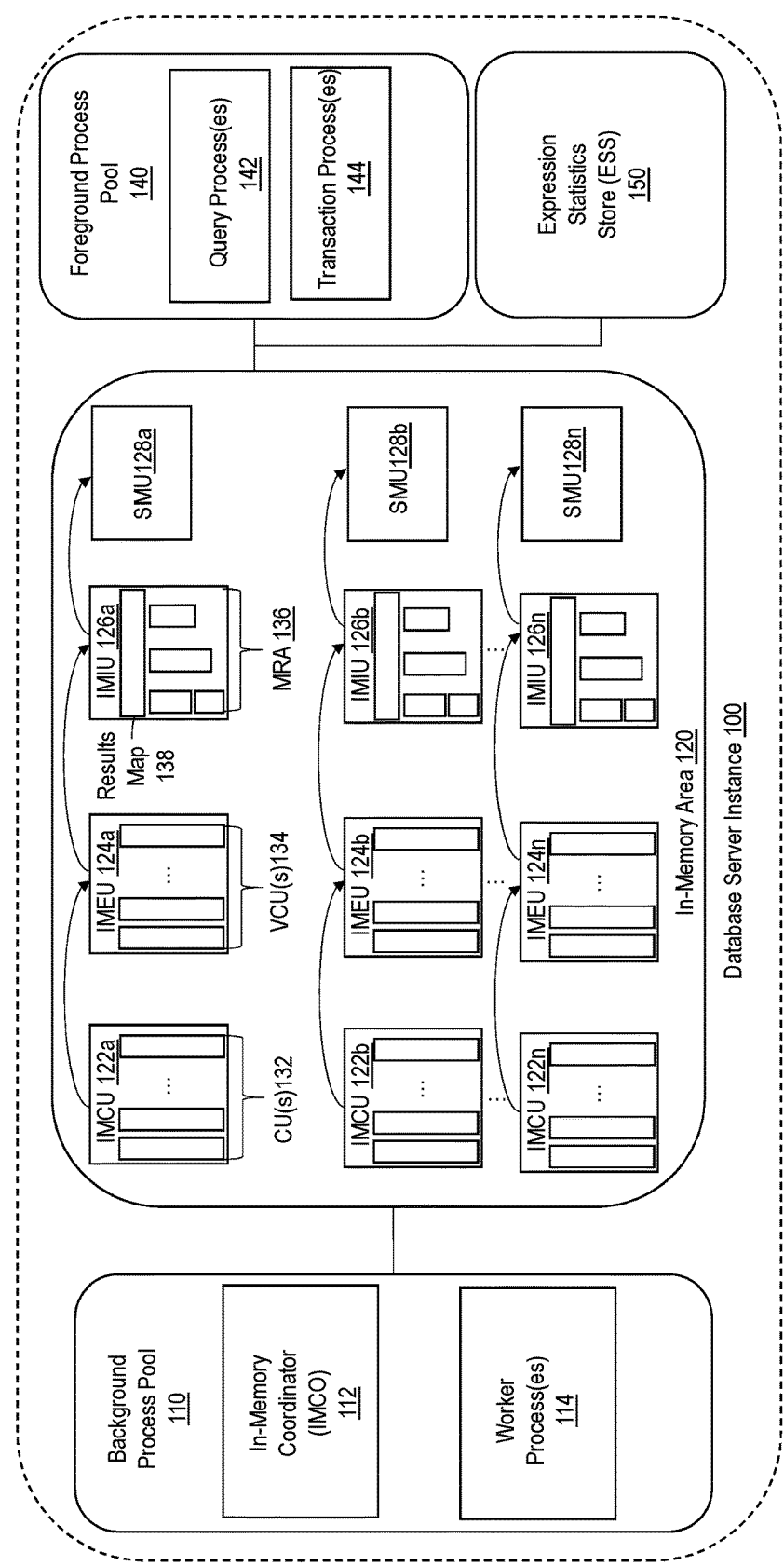
FIG. 1 is a block diagram depicting an example system design for creating and maintaining in-memory units that cache results of expression evaluations and internal computations, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Analytic queries often contain complex expressions or calculations that can consume a large amount of system resources during execution. By automatically identifying these frequently used complex expressions or calculations and caching their results, a database server may improve query performance and increase scalability by reducing repeated computations and thus, reducing the system resources consumed during execution. In addition, query processing on certain data-types can be improved by storing an efficient in-memory optimized representation.

In various embodiments, computer systems, stored instructions, and technical steps are described for capturing and processing "in-memory expressions" (also referred to herein as "IMEs". An "in-memory expression", as used herein, is broadly classified as any expression for which the results have been pre-computed and cached in volatile memory. The pre-computed results of an IME are referred to herein as "pre-computed results" or PCRs. PCRs may be both cached in volatile memory and persistently-stored, or may exist only in volatile memory (without any persistently-stored copy). PCRs may include results computed at different levels of granularity, which provides flexibility during query optimization and execution.

In order to store PCRs of IMEs, a set of in-memory units, referred to herein as "in-memory columnar units (IMCUs)" and "in-memory expression units (IMEUs)", are allocated and maintained by a database server instance. An IMCU stores a set of column units, where each column units corresponds to a column that belongs to an on-disk table within a database managed by a database server instance and includes data items from the corresponding column. An IMEU stores a set of one or more "virtual column units", where each virtual column unit may store PCRs that are derived by evaluating an expression on at least one of the one or more columns. A pointer and/or other association data is stored in volatile or non-volatile memory (e.g., in the header of the IMCU) to associate the set of column units with the set of virtual column units. Queries against the IMCU may access PCRs from the set of virtual columns rather than re-computing the expression results.

According to an embodiment, the database server instance also maintains in-memory units referred to herein as "in-memory internal units (IMIUs)". IMIUs store a set of metadata values for computations that are being tracked by a database server instance. The IMIU may further store one or more sets of results for one or more computations. In an embodiment, responsive to the database server instance receiving a query, the database server instance identifies a set of computations for evaluation during execution of the query. Responsive to identifying the set of computations, the database server instance evaluates at least one computation in the set of computations to obtain a first set of results for a first computation in the set of computations. After evaluating at least one computation, the database server instance stores, within an in-memory unit, the first set of computation results. The database server also stores mapping data that maps a set of metadata values associated with the first computation to the first set of computation results. If subsequent queries are received that involve the computation, the database server instance may access the cached computation results from IMIU rather than re-evaluating the computation.

System Overview

In an embodiment, a database server comprises an IME framework. The IME framework supports a variety of functions for capturing and processing IMEs including, without limitation
- Identifying expressions and other computations for in-memory materialization;
- Creating and maintaining in-memory units for caching IMEs and other computations; and
- Querying the in-memory units for faster projection and predicate evaluation.

FIG. 1 is a block diagram depicting an example system design for creating and maintaining in-memory units that cache results of expression evaluations and internal computations, according to an embodiment. Database server instance 100 includes background process pool 110, in-memory area 120, expression statistics store 150, and foreground process pool 140.

Background process pool 110 includes a plurality of background processes, including in-memory coordinator (IMCO) 112 and worker processes 114, which are responsible for performing background tasks within in-memory area 120. In an embodiment, background population and other tasks for the background processes are enqueued as they arise. IMCO 112 may then coordinate execution of these tasks with worker processes 114. IMCO 112 may assign and balance tasks amongst worker processes 114, which may perform certain tasks in parallel.

In-memory area 120 stores a plurality of in-memory units including IMCUs 122a to 122n, in-memory expression units IMEUs 124a to 124n, in-memory internal units IMIUs 126a to 126n, and shared metadata units (SMUs) 128a to 128n. Each in-memory unit may comprise one or more contiguous chunks of memory, referred to herein as "in-memory extents", that are specifically allocated for the unit. Metadata that defines the various attributes of the in-memory units may also be maintained by database server instance 100. For instance, the metadata may include, without limitation, extent lists that identify which in-memory extents belong to a particular in-memory unit, free space pointers that point to available storage space within the unit, and identifiers that uniquely identify each in-memory unit. Each of the different types of in-memory units is described in further detail below.

Foreground process pool 140 includes a set of foreground processes that are responsible for processing queries as they are received. The foreground processes include query processes 142, which perform tasks such as query compilation, query execution plan generation and optimization, parallel query coordination, and query execution. The foreground processes further include transactional processes 144, which maintain the atomicity and consistency of database transactions with respect to in-memory area 120.

Expression statistics store (ESS) 150 tracks various statistics and other metadata values for expressions that have been submitted in queries. Although depicted as residing outside of in-memory area 120, in some implementations, ESS 150 may be maintained, in whole or in part, within in-memory area 120. In addition or alternatively, ESS 150 may be stored persistently on disk or in some other non-volatile storage media.

Expression Evaluation

During query execution, query processes 142 may evaluate one or more query expressions that are included within a query. An "expression" in this context refers to a query construct that specifies one or more operations and one or more operands on which the one or more operations are performed. The operations may be specified using a set of commands, such as structured query language (SQL) statements, mathematical operators, etc. The operands may correspond to objects, such as columns and column functions, constants, or other values. As an example, the expression "a*b" includes the operands "a" and "b", which correspond to different columns in a table. The expression further includes the multiplication operator "*", which causes a database server instance to multiply values from columns "a" and "b" when evaluating the expression. The combination and types of operators used may vary widely between different query expressions.

Expressions may occur in various locations within a database query. In a SQL statement, for instance, expressions may exist in a select list, aggregation function, a SQL clause, or within some other SQL construct. Table 1 below depicts example database queries, where each query includes one or more expressions. The following queries might not be useful in real world applications, but are provided for illustrative purposes to discuss the identification and tracking of query expressions. Each query is associated with a query identifier to aid in the discussion below.

TABLE 1

SAMPLE QUERIES INCLUDING DIFFERENT EXPRESSIONS

| QUERY ID | QUERY |
|---|---|
| Q1 | Select sal + comm<br>From emp |
| Q2 | Select *<br>From emp<br>Where upper(name) = 'SCOTT' |
| Q3 | Select sum(sal)<br>From emp<br>Group by to_date(hiredate, format) − 2 |
| Q4 | Select e.sal, d.name<br>From emp e, dept d<br>Where e.deptno * 2 = d.deptno * 2/3 |

Queries Q1 to Q4 include various types of expressions in different parts of a query. For instance, query Q1 includes the expression "sal + comm." in the select list, Q2 includes the expression "upper(name)" in the where clause, and Q3 includes the expression "to_date(hiredate, format) − 2" in the group by clause. In Q4, two expressions "deptno * 2" and "deptno * 2/3" are located in the where clause.

An expression may be completely subsumed by another expression, according to an embodiment. Expressions that are subsumed by other expressions may also be referred to herein as sub-expressions. An expression that is a composite of multiple sub-expressions but that is not a sub-expression itself is herein referred to as a "top-level expression". For example, the composite expression "(a+b)*(c+d)" may be considered a top-level expression that includes the sub-expressions "a+b" and "c+d".

The example expressions provided above included constructs that were explicitly recited in a query. However, in some embodiments, a database server instance may identify and cache implicit expressions and/or other computations. An implicit expression is an expression that a query optimizer generates during query compilation to optimize a query execution plan even though the expression was not explicitly recited in the database query. As an example, if a database query includes the expression "alike 'cat'", the optimizer may break the expression up into two parts: "a>'c'" and "a like 'cat'". The first expression may be included as a preliminary filtering measure to reduce the number of times the relatively costly expression "a like 'cat'" is evaluated. The implicit expression may be added to a query execution plan as a target operator that operates on a set of input rows to derive a set of output rows.

Explicit and implicit expressions are examples of computations where there is a one-to-one mapping between rows in the expression results and the table rows from one or more operand columns used to compute the expression results. For instance, each row of expression results for "a+b" may be derived from values of a corresponding table row in columns "a" and "b". Other forms of computations may not have a one-to-one mapping between table rows and computation results. As an example, a bloom filter operation may apply a hash function to the values of distinct dictionary entries of a join key column. As some values within the column may not be distinct, multiple rows may map to the same dictionary entry and hash value.

Some computations are computed internally during query execution without being explicitly recited in a query. For instance, operations such as data conversions, hashing, concatenations, etc. may be performed even though such operations were not explicitly recited in the query. In some cases, these operations are selected by a query optimizer during query compilation to optimize execution of the query. Database server instance 100 may track and cache explicit expressions, implicit expressions, internal computations, and/or other forms of computations.

In-Memory Columnar Units

IMCUs 122a to 122n each store a set of one or more column units (CUs), such as CUs 132, which correspond to one or more on-disk columns that belong to one or more on-disk tables within a database managed by database server instance 100. Conceptually, each of IMCUs 122a to 122n divides the rows of a table into separate chunks. The rows within a chunk are converted to column-major format and may be compressed based on a chosen in-memory format. The rows of the chunk are then loaded into an IMCU as one or more CUs, where the CUs adhere to the in-memory format. As an example, IMCU 122a may include a first set of one or more column units, where each column unit corresponds to a different respective column of table t and stores the first million rows for the respective column in compressed or uncompressed column-major format. Similarly, IMCU 122b may comprise a second set of one or more column units, where each column unit in the second set corresponds to a different respective column of table t and stores the second million rows for the respective column in compressed or uncompressed format. The remaining rows of table t may similarly be divided into chunks and cached in other IMCUs within in-memory area 120.

In-Memory Expression Units

Each of IMEUs 124a to 124n is an in-memory cache where IMEs are stored for future reuse to improve query performance. In an embodiment, database server instance 100 allocates a fixed amount of memory for IMEUs 124a to 124n in an on-demand basis and maintains each of IMEUs 124a to 124n as a bounded cache. Once space is allocated for an IMEU, database server instance 100 identifies expressions that will benefit from caching and stores the evaluation results for the IME in one or more of IMEUs 124a to 124n.

An IMEU may be implemented as a logical extension of an IMCU. An IMCU that an IMEU logically extends is herein referred to as a "parent" IMCU. Within the parent IMCU, mapping data, such a pointer, is maintained within the IMCU header to link the set of CUs maintained in the IMCU with the expression results cached in the IMEU. The IMEU may also store a back pointer to the parent IMCU, depending on the particular implementation. During scan operations on the IMCU, the pointer may be used to identify the corresponding IMEU and any expression results cached therein. Each of IMEUs 124a to 124n thus acts as a per-IMCU container for storing expression results for the parent IMCU.

In an embodiment, database server instance 100 may automatically allocate space for IMEUs 124a to 124n to extend the corresponding parent IMCUs. For instance, when an IMCU is created for a particular segment that has been enabled for in-memory storage, a corresponding IMEU may also be created and mapped to the newly created IMCU. If the parent IMCU is dropped from memory, then the corresponding IMEU may also dropped from memory.

In an embodiment, each IMEU stores PCRs for expressions that operate on one or more columns corresponding to the column units stored in the parent IMCU. As an example, IMCU 122a may store values for rows one to ten of columns "a" and "b" of a particular table while IMCU 122b stores values from rows eleven to twenty from the same table columns. If the expression "a*b" is identified as an IME, then IMCU 122a may include a pointer to IMEU 124a, which stores PCRs of "a*b" for the first ten rows. IMCU 122b may include a pointer to IMEU 124b, which stores the expressions results of "a*b" for the next ten rows. Similarly, others rows from the operand columns and PCRs for the IME may respectively be distributed across different IMCUs and IMEUs.

An IMEU may also inherit a set of attributes from the parent IMCU and a base on-disk segment that was used to populate the parent IMCU. For example, if the base segment and parent IMCU are part of a cluster that is distributed or duplicated, then the IMEU may also be distributed or duplicated across multiple nodes of a distributed database. As another example, data in the IMEU may inherit the compression scheme of the parent IMCU, thereby causing a database server instance to compress data in the IMEU using the same compression algorithm used to compress column units in the IMCU.

Virtual Column Units

PCRs are similar to columns in that the PCRs of a given expression include a single value per row. Consequently, PCRs can be considered virtual columns, and the structures that stores PCRs are referred to herein as "virtual column units" or VCUs. In an embodiment, each of IMEUs 124a to 124n stores PCRs as a set of one or more virtual column units. A VCU may store values from the PCRs of an expression in compressed or uncompressed one-result-value-per-row format. As an example, database server instance 100 may derive a column vector in response to evaluating the expression "a/b", where each row in the column vector includes a result value obtained by dividing a first value in a row of column "a" by a second value in the corresponding row of column "b". Thus, the first row in the column vector has a result value obtained by dividing the first value in column "a" by the first value in column "b", the second result value is obtained by dividing the second value in columns "a" by the second value in column "b", etc. If the expression "a/b" is identified for caching, then the database server instance creates, within an IMEU, a virtual column unit that stores the PCRs for "a/b" such that consecutive values within the column vector are stored contiguously in memory.

A virtual column may be comprised of multiple VCUs that are distributed across different IMEUs. This scenario may occur where actual columns of a table that serve as operands to an expression are distributed across different IMCUs. As an example, IMCU 122a may store the first one hundred rows of columns "a" and "b" from table "t", and IMCU 122b may store the second one hundred rows of columns "a" and "b". In order to cache the PCRs for the expression "a*b", a database server instance may store a first virtual column unit in IMEU 124a that contains the PCRs for the first hundred rows and a second virtual column unit in IMEU 124b that contains the PCRs for the second hundred rows. Other virtual column units that belong to the same virtual column may be distributed across other IMEUs such that the virtual column units maintain a one-to-one relationship between the number of rows in the virtual column unit and the number of rows in the column units of the associated IMCU.

When an IMEU caches PCRs for a single IME, a single VCU may be used to store the PCRs. If the IMEU caches PCRs for multiple IMEs, then the IMEU may store PCRs across multiple VCUs, where different VCUs store the PCRs for different IMEs. For instance, IMEU 124a stores VCUs 134, which may include a first virtual column unit materializing PCRs for a first expression (e.g., "a*b") and one or more additional virtual column units that materialize the PCRs for additional expressions (e.g., "a+c", "upper(b)", etc.). VCUs 134 may logically extend the CUs maintained within the parent IMCU per the mapping data that is maintained to link the parent IMCU to the IMEU.

A virtual column may be associated with one or more column identifiers, which may be associated with the one or more VCUs that are part of the virtual column. Example column identifiers include, without limitation:

Internal column numbers that are based on a logical ordering of columns within a table;

Segment column numbers that are based on a physical ordering of columns stored on disk; and User column numbers that are based on a user-defined logical ordering of columns within a table.

Logical column numbers may be assigned to virtual columns sequentially or in any other manner that uniquely identifies a position of the virtual column within a corresponding table. Segment column numbers may be assigned a null or zero value since virtual columns are not persistently stored on disk. However, in some database management systems, certain layers of a database server instance may rely on the segment number to uniquely identify a column. In such scenarios, a false segment column number may be used for the virtual column. The false segment column number may be selected such that it does not conflict with segment column number used for non-virtual columns of the table that are physically stored on disk. Column numbers and other metadata that define properties of the virtual column may be stored in a header of the virtual column.

For a given expression, the pre-computed results of the expression for all rows in a table are collectively referred to as the "entire virtual column" for that expression. In some instances, the entire virtual column for an expression may be stored in one or more VCUs. When the entire virtual column for an expression is cached, evaluation result for every row is stored and accessible from at least one IMEU. In other instances, a first portion of the virtual column is stored in memory while a second portion is not pre-computed. In such scenarios, only a subset of the rows in the evaluation results are stored in one or more IMEUs. A different subset of rows may not be pre-computed when a portion of the columns that serve as operands are not stored in IMCUs due to memory constraints or other reasons. If this occurs, the portion of the VCU that is cached may be directly accessed from in-memory area 120. The portion that was not pre-computed may have values computed at runtime. If some of the pre-computed results are stored on disk instead of in volatile memory, then the pre-computed results may be loaded into volatile memory at runtime of a query that requires evaluation of the expression that corresponds to the results.

In an embodiment, VCUs are compressed using one or more compression techniques, such as dictionary encoding, run-length encoding, etc. The VCUs may be compressed at the same level as the CUs within the parent IMCU or at a different level of compression, depending on the particular implementation. If compressed at a different level, a compression analyzer may be used to analyze the benefits of various compression algorithms if applied to the VCU data and recommend a level of compression. The VCU may be compressed at a higher level than the CUs in the parent IMCU to minimize the space footprint within in-memory area 120 for each of the materialized expressions.

Identification of Expressions for In-Memory Materialization

In an embodiment, database server instance 100 includes logic for identifying expressions that will benefit from in-memory materialization within IMEUs 124a to 124n. The expressions may be identified from one or more sources.

Example sources may include, without limitation, user-defined virtual columns that are explicitly identified by a user for caching and query expressions that have not been explicitly identified by a user for caching but that are automatically detected and selected for caching by database server instance 100.

A user, such as a database administrator, database client, or other application program, may explicitly define virtual columns for in-memory materialization. The user may define the virtual column, and the expressions used to populate the in-memory columns, through a database command. As an example, a virtual column may be defined through the following data definition language (DDL) statement: "create table t (a number, v as (2*a), c number)". Here, "a" and "c" are regular on-disk columns, and "v" is a virtual column. The virtual column "v" is defined as an expression on column "a" multiplied by the constant "2". Other virtual columns may similarly be defined as an expression on one or more operands, where the operands may include physical columns and/or constants. The virtual column has no physical allocation and its values are not physically stored on disk. The virtual column may appear like a physical columns when queried, but the values are computed or, if materialized in memory, retrieved from one or more IMEUs at runtime during query execution.

In addition or as an alternative to materializing user-defined virtual columns, database server instance 100 may automatically detect expressions that would benefit from in-memory materialization. Database server instance 100 may determine which expressions would benefit from in-memory materialization based at least in part on expression statistics maintained in ESS 150. The expressions statistics that are used to determine whether to materialize an expression may vary from implementation to implementation. As an example, database server instance 100 may select the top n most frequently evaluated query expressions from ESS 150 to materialize. In another example, database server instance 100 may select the top n most costly query expressions from ESS 150 to materialize. The cost of an expression may be determined based on the amount of processing and/or other computational resources consumed during expression evaluation. In another example, the database server instance 100 may multiply the evaluation count of an expression by a per evaluation cost of the expression to compute a ranking value for the expression. In-memory area 120 may cache the highest ranked expressions as determined by the ranking values associated with each expression. In other embodiments, other statistics and criteria may be used to select expressions to materialize in memory.

For each unique expression, ESS 150 may track
  Compile-time information, such as static costs, expression text, etc.; and
  Run-time information such as dynamic costs, expression evaluation counts, timestamps of expression evaluation, etc.

Database server instance 100 may use one or more of the statistics to rank, sort, and select expressions for materialization within in-memory area 120. As an example, database server instance 100 may determine, based on the compile-time and run-time information stored in ESS 150, which expressions being tracked are currently the "hottest". A heat level value or ranking for an expression may be computed as a function of evaluation frequency and evaluation costs. ESS 150 may sort expression entries by their ranking to facilitate identification of the top n hottest expressions.

In an embodiment, expressions identified for in-memory materialization are added to a corresponding table as a hidden virtual columns. Hidden virtual columns, like user-defined virtual columns, do not have their values physically stored on disk and may be distributed across one or more in-memory VCUs. Hidden virtual columns differ from user-defined virtual columns in that the hidden virtual columns are not visible to the user. As an example, when a "select *" or "describe" operation is performed on a table, the user may view which physical and user-defined virtual columns belong to the table. However, the hidden virtual column information is not returned or displayed.

Predictive analytics may also factor into the selection of expressions for caching, according to an embodiment. Database server instance 100 may include an analytic component that predicts, based on statistics maintained in ESS 150, which expressions are likely to become hot based on trends detected from recently received queries. For example, if certain queries extract the day part of a date column, the analytic component may predict that storing other parts of the date (such as months, years) as hidden virtual columns may be helpful. Similarly, database server instance 100 may predict which other expressions will become "hot" based on frequent co-occurrence patterns tracked within ESS 150.

Background Population of IMEUs

Once an expression is identified for in-memory materialization, database server instance 100 evaluates the expression and populates one or more IMEUs with the PCRs. During population, a one-to-one mapping may be maintained between rows in the IMEU and rows in the parent IMCU. As an example, if database server instance 100 is populating in-memory area 120 with evaluation results for the expression "e/f", database server instance 100 may store the evaluation results in the IMCUs that contain values from the operand column used to compute the results. Thus, if IMCU 122a stores the first million rows for columns "e" and "f", then database server instance 100 generates a VCU in IMEU 124a that includes the first million rows of the PCRs. Similarly, if IMCU 122b stores the second million rows for columns "e" and "f", then database server instance 100 generates a VCU in IMEU 124b that includes the second million rows of the PCRs.

In an embodiment, background process pool 110 includes a set of background processes that are responsible for populating IMEUs with PCRs. By using a background process, expression result values may be loaded into VCUs without the foreground query processes suffering a drop in performance. Background process pool 110 includes IMCO 112 for coordinating background population of IMEUs 124a to 124n, and worker processes 114 that load expression result values into IMEUs 124a to 124n. IMCO 112 may distribute population tasks across different worker processes, which may operate in parallel to load PCRs into IMEUs 124a to 124n.

Figure 2:
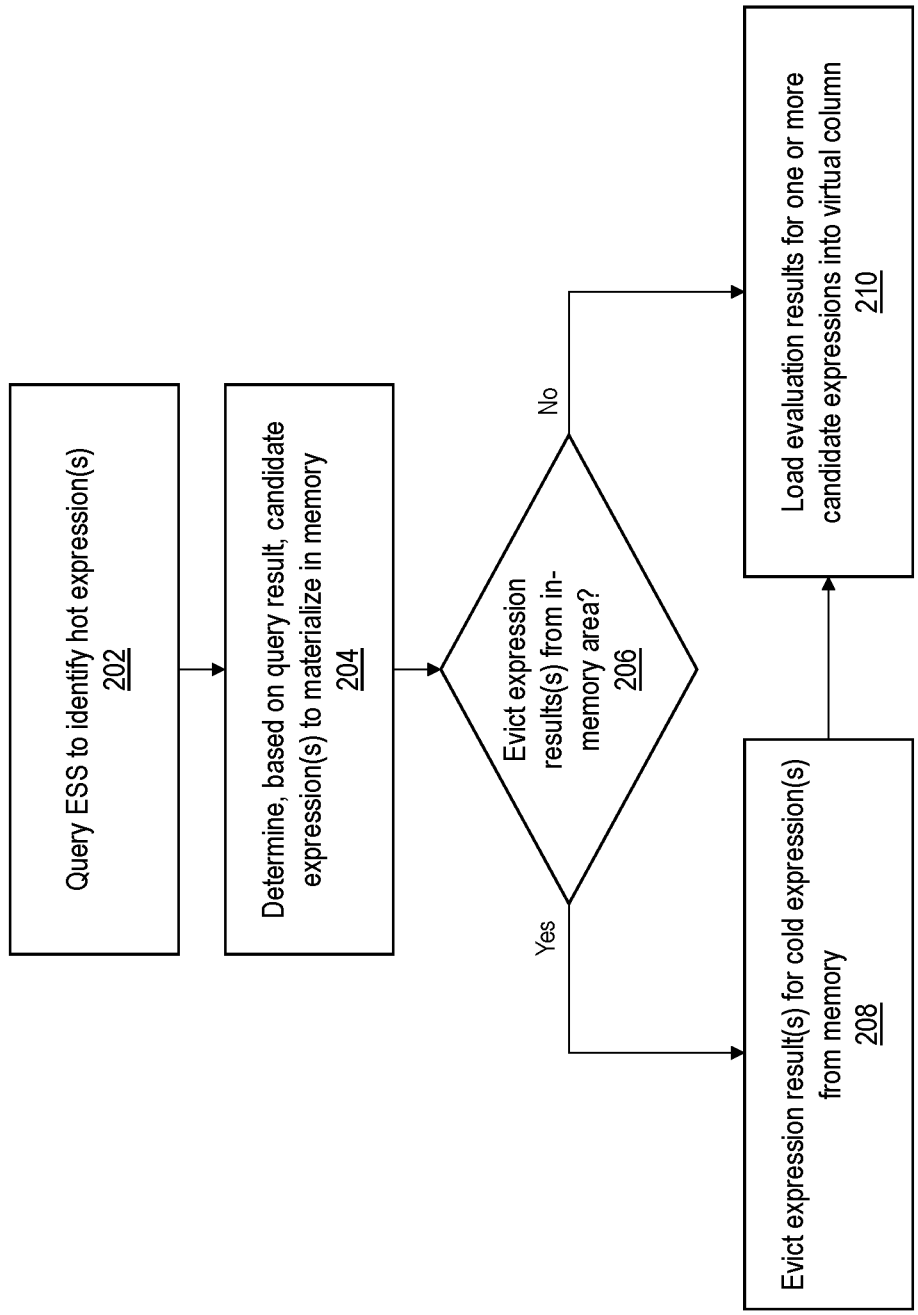
FIG. 2 is a flowchart depicting an example process for performing background population for an in-memory expression, according to an embodiment.

FIG. 2 depicts an example process for performing background population for an in-memory expression, according to an embodiment. At step 202, a background process, such as IMCO 112, queries ESS 150 to identify hot expressions for in-memory materialization. Querying of ESS 150 may be performed on a periodic basis, triggered by receipt of a database query, or performed responsive to some other event, depending on the particular implementation.

At step 204, the background process determines, based on the query, one or more candidate expressions to materialize in memory. For example, the background process may query ESS 150 for the top n "hottest" expression ranked as a function of evaluation count and cost, as previously described. If any of the top n expressions returned by ESS 150 are not yet materialized in memory, the background process may select the expression as a candidate for materialization.

At step 206, the background process determines whether to evict any materialized expressions from in-memory area 120 to make space for the candidate expression(s) selected for materialization. If there is not enough space to cache the candidate expression(s), then the process continues to step 208. Otherwise, the process continues to step 210.

At step 208, the background process evicts one or more virtual columns from in-memory area 120. The background process may implement a cache replacement policy to determine which virtual columns to evict. In an example, the background process determines, based on the statistics stored in ESS 150, which of the currently cached virtual columns is "coldest". A virtual column may be considered "coldest" if it was the least recently accessed, least frequently used, or based on some other criteria. The background process may evict the virtual column by marking it as unusable and/or dropping the virtual column from the table.

At step 210, the background process computes and loads, for each candidate expression, result values into one or more VCUs. For each respective IMEU, the background process may access the operand column values for the candidate expression from the parent IMCU. If values from the operand columns are stale or the parent IMCU does not currently exist, then the background process may retrieve these values from disk, create a new IMCU if one does not exist, and load these values into the parent IMCU. The values from the operand columns are then used to compute the evaluation results, which are stored in the corresponding IMEU.

IMEU Consistency Maintenance

In an embodiment, IMCUs 122a to 122n and IMEUs 124a to 124n are maintained as read-only units. In this state, transactional changes that occur after data is loaded into an IMEU and parent IMCU is not instantly materialized within these in-memory units. One reason for not materializing the results instantly is that CUs and VCUs store data in compressed or uncompressed column-major format. While column-major format provides significant advantages for processing many analytic queries, updates can generally be performed more efficiently on data stored in row-major format. Therefore, the updates may be directed to objects that store data in row-major format rather than IMCUs 122a to 122n and IMEUs 124a to 124n, which store data in column-major format.

In order to maintain transaction consistency, database server instance 100 monitors for changes to the operand column values. If a transaction commits an update to a value within a row of an operand column, then the PCRs that are cached for that row are no longer valid. To prevent stale PCRs from being returned, shared metadata units 128a to 128n track which row values cached within in-memory area 120 are no longer valid. In response to detecting an update to a row within a segment that is in-memory enabled, transaction processes 144 may update one or more of SMUs 128a to 128n to indicate the row, within the in-memory units, is no longer valid. In alternative embodiments, invalidation information may be maintained at a finer granularity than rows. For example, within a row that is updated, the database server instance may track which columns were actually updated. If a column was not updated even though the row was updated, then the value in that column may still be treated as valid. Similarly, the pre-computed result for a row may be treated as valid is the values from the column(s) that are involved in the expression were not updated, even if other columns for the same row were updated.

By maintaining a one-to-one mapping of table rows between an IMEU and the parent IMCU, the same SMU may be used to track changes for both in-memory units. Any row that is invalid in the IMCU is also invalid in the IMEU. If the row is invalid, then the values for that row are provided from the latest image either on disk or in a transaction journal rather than the IMCU or IMEU. Each of SMUs 128a to 128n may therefore be associated with a corresponding IMCU and IMEU to track the status of individual rows within the CUs and VCUs contained therein. For instance, SMU 128a tracks the validity of rows within CUs 132 and VCUs 134. Similarly, SMU 128b tracks the validity of rows for CUs stored in IMCU 122b and VCUs stored in IMEU 124b, and SMU 128n tracks the validity of rows for CUs stored within IMCU 122n and VCUS stored in IMEU 124n.

Figure 3:
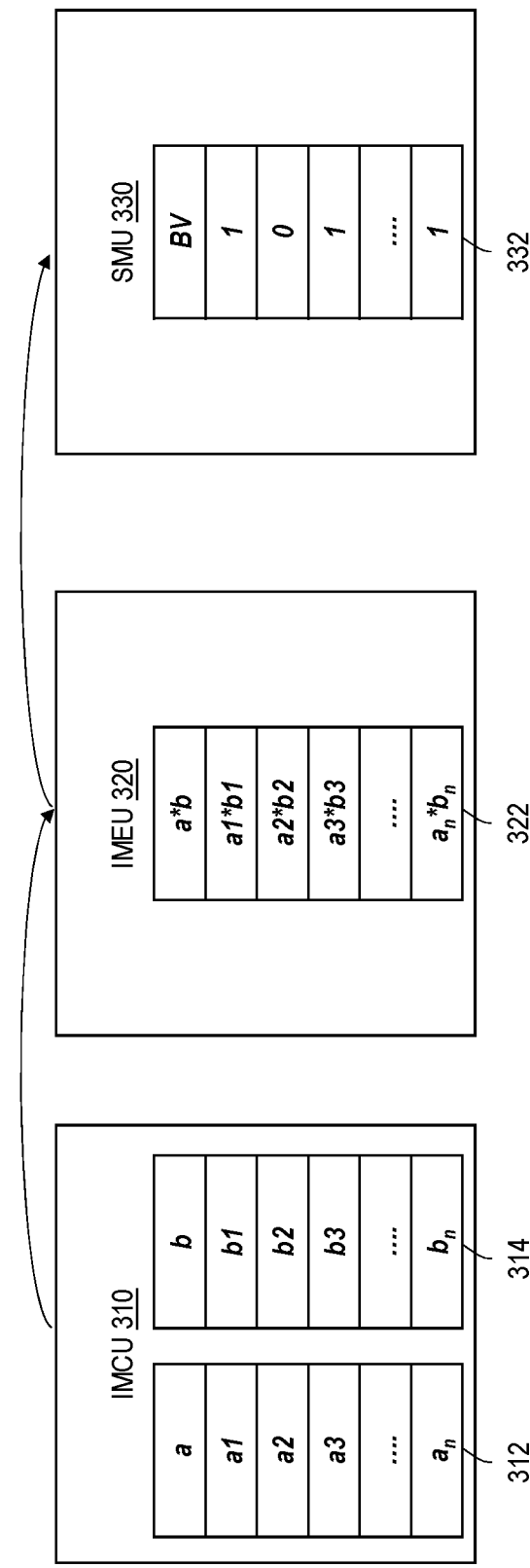
FIG. 3 is a block diagram depicting an example Shared Metadata Unit that maintains metadata that is shared by an IMCU-IMEU pair, according to an embodiment.

Referring to FIG. 3, it depicts SMU 330, which is used to track which rows are valid within IMCU 310 and IMEU 320. IMCU 310 includes CU 312 and CU 314, and IMEU 320 includes VCU 322. CU 312 stores values from column a, and CU 314 stores values from column b. IMEU stores PCRs for the expression "a*b" SMU 330 stores invalidity bit-vector (BV) 332, where each bit corresponds to a particular row and the value of the bit indicates whether the corresponding row is valid or invalid. If a data manipulation language (DML) transaction updates a row that has not previously been invalidated, then the bit value for that row in BV 332 is changed to indicate that that row in CU 312, CU 314, and VCU 322 is no longer valid. During query processing, query processes 142 may read BV 332 to determine which cached values to retrieve from in-memory area 120 and which values to retrieve from a transaction journal or disk. As illustrated, the same bit-vector may be used to track the validity of rows in both IMCUs and IMEUs.

As read-only units, IMCUs 122a to 122n and IMEUs 124a to 124n are built from data that was current as of a certain point in time. Changes made after that point in time would not be reflected in the IMCUs 122a to 122n and IMEUs 12a to 124n. For instance, IMCUs 122a to 122n and IMEUs 124a to 124n may store data that is current up to a load system change number (SCN) or other logical timestamp. SMUs 128 to 128n track transactional changes on a row spanned by the IMCU after the load time of the IMCU. In some cases, the changed rows may be logged in a transaction journal that records which transactions have been committed. In order to leverage the transactional notion of invalidation tracking in SMUs 128a to 128n, the database server instance 100 may populate an IMEU such that it is built as of the same logical time as the parent IMCU. When such consistency is maintained, rows that are marked invalid in the IMEU may also be treated as invalid in the parent IMCU and vice versa. In order to build the IMEU such that the PCRs are built as of the same logical time as the operand values in the IMCU, the background processes responsible for populating the IMEU may issue flashback queries based on the load SCN of the IMCU. With flashback queries, past data is returned as it existed at the time of the SCN specified in the flashback query. Thus, the background process disregards updates to operand column values that may occur between the time the IMCU is built and the time the IMEU is built. When such consistency is maintained, the addition of an IMEU logically widens each row of the parent IMCU. The IMEU may conceptually be thought of as adding more columns to the row. In the case of the IMEU, virtual column are added to the physical columns stored in the IMCU.

Repopulation of In-Memory Column Units

In order to refresh in-memory units that have become stale, database server instance 100 queues repopulation tasks to refresh invalid data within IMCUs 122a to 122n and IMEUs 124a to 124n. IMCO 112 may coordinate repopulation of the in-memory units by assigning and distributing repopulation tasks in the queue among worker processes 114. When assigned a repopulation task, the worker process reloads updated values into the parent IMCU. The worker process further re-computes expression result values for invalid rows and loads the updated expression result values into the IMEU. The worker process also updates the corresponding SMU to indicate that the updated rows are no longer invalid.

In an embodiment, IMEUs 124a to 124n are repopulated whenever the parent IMCU is repopulated. Thus, IMEU 124a may be repopulated whenever IMCU 122a is repopulated, IMEU 124b may be repopulated whenever IMCU 122b is repopulated, etc. By repopulating related in-memory units as part of the same repopulation task, the IMEU is kept in sync with the parent IMCU. Thus, consistency is maintained between the CUs in the IMCU and the VCUs in the IMEU.

Database server instance 100 may prioritize repopulation tasks based on a set of one or more replacement policies. The set of replacement policies may take into account various factors including, without limitation, the number of rows invalidated, the number of scans on a particular IMCU or IMEU, user-specified priority levels for a table, and compression levels. For instance, if database server instance 100 determines, from SMU 128a, that a threshold number of rows has been invalidated, then database server instance 100 may queue a repopulation task for IMCU 122a and IMEU 124a. The threshold may vary depending on how frequently IMCU 122a and IMEU 124a are accessed. As the frequency of accesses increases, the threshold number of rows that trigger a repopulation may be reduced.

When an IMCU and IMEU pair are scheduled for repopulation, the previous versions of the IMCU and IMEU may remain accessible and available to queries until the repopulation task is complete. For instance, if a background process is loading values into a new version of IMCU 122a and IMEU 124a, database server instance 100 may receive a query that requires access to a value which is cached in a previous version of IMCU 122a. In such a scenario, a foreground process executing the query may access the value from the previous version of IMCU 122a. Once repopulation is complete, the previous versions of the IMCU and IMEU may be immediately discarded or may continue to remain accessible for a configurable duration of time. By maintaining the previous versions, the storage footprint of the IMCU-IMEU pair is increased. However, queries that are received with a scan SCN lower than the load SCN of the new version of the IMCU-IMEU pair, but greater than the load SCN of the previous version of the IMCU-IMEU pair may benefit from accessing values from the previous version of the IMCU-IMEU pair.

Query Optimization Using In-Memory Expressions

By storing results of 'hot' expressions on a per-row basis in IMEUs, a query optimizer may improve performance of subsequent queries that refer to the materialized expressions. Rather than re-evaluating the expression, database server instance 100 may access the PCRs from in-memory area 120. In addition, by materializing user-defined virtual columns, database server instance 100 can provide the user with scan performance similar to that of a physical on-disk column that has been materialized in-memory, but without the extra-disk overhead.

In an embodiment, queries are rewritten to access materialized expressions stored in hidden virtual expressions. If database server instance 100 determines that evaluation results for an expression are stored in a virtual column, database server instance 100 replaces the reference to the expression with a reference to the hidden virtual column. As an example, if the sub-expression "(a+b)" of expression "(a+c+b)" has been materialized as hidden virtual column "v", then the database query "select a+c+b from t where a>0" can be re-written as "select v+c from t where a>0". During query execution, the value of "v" is read directly from an IMEU, thereby retrieving the PCRs and avoiding re-evaluation of the sub-expression "(a+b)".

Figure 4:
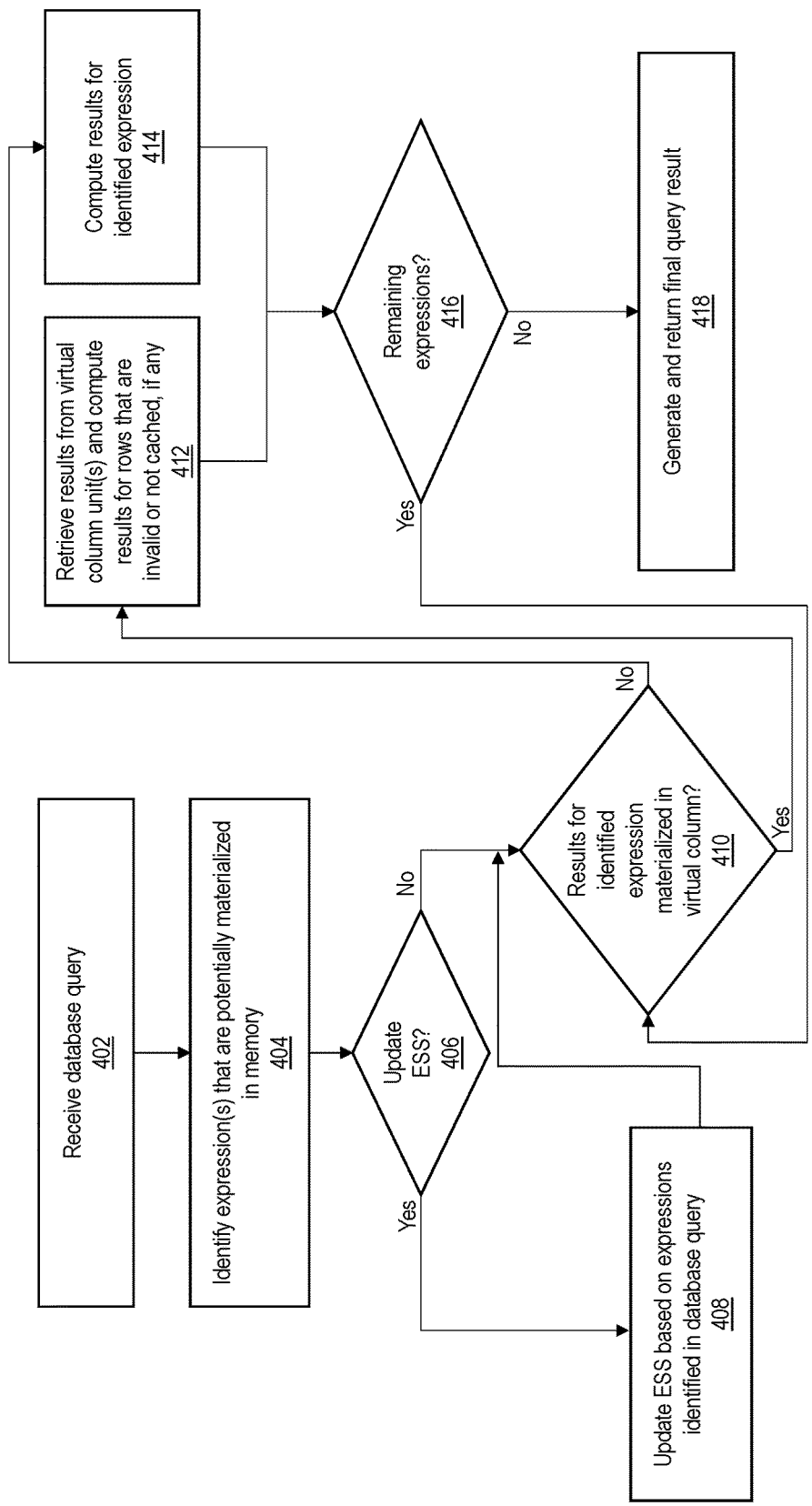
FIG. 4 is a flowchart depicting an example process for identifying and using in-memory expressions to optimize query execution, according to an embodiment.

FIG. 4 is a flowchart depicting an example process for identifying and using in-memory expressions to optimize query execution, according to an embodiment. The process may be performed by one or more foreground processes, such as query processes 142. At step 402, database server instance 100 receives a database query. The database query may be input directly by a user, received over a network from a database client, or submitted through some other application.

At step 404, database server instance 100 identifies expressions included in the database query that may potentially be materialized within in-memory area 120. As an example, the query: "select a*b from T where c=1 and e/f=10" has two expressions, "a*b" and "e/f" that may potentially be materialized in an IMEU. An "identified expression" as used herein may refer to an expression explicitly recited in the query, an implicit expression, or a previously-defined virtual column that is derived from the results of an expression. If an identified expression is associated with a hidden virtual column, then the database query may be rewritten to access the hidden virtual column as previously described.

At step 406, database server instance 100 determines whether to update ESS 150 based on the identified expressions. In some embodiments, expression tracking may not be enabled, may be enabled only for certain expressions, or may not be supported. In other embodiments, expression tracking may be applied to all identified expressions or some subset thereof. If database server instance 100 decides to update ESS 150, then the process continues to step 408. If database server instance 100 determines that the identified expressions should not be tracked, then the process continues to step 410.

At step 408, database server instance 100 updates ESS 150 based on an occurrence of the identified expressions within the query. To query and update ESS 150, database server instance 100 generates an expression identifier for each distinct expression on a per-table basis. The expression ID may be computed based on the canonical form of the text representation of the expression. For example, expressions "a+b" and "b+a" are considered the same expression for a particular table. The expression ID can be a hash value of the canonical representation of an expression and the base table object number or some other value that uniquely identifies the expression. If an entry does not already exist in ESS 150 for an identified expression, then a new expression entry may be created. Otherwise, the existing entry may be updated based on the compile-time and/or runtime information collected for the expression.

At step 410, database server instance 100 scans in-memory area 120 to determine whether IMEUs 124a to 124*n* includes any VCUs that store results for an identified expression referenced by the database query. In order to perform the scan, database server instance 100 may assemble a set of IMCUs and IMEUs based on the columns referenced by the database query. Assembling the IMCUs and IMEUs may involve decompressing, if compressed, the CUs in the IMCU and VCUs in the IMEU and gathering the CUs and VCUs for the columns and expressions referenced by the database query. In an embodiment, database server instance 100 scans IMEUs 124*a* to 124*n* for VCUs that have a column number that is associated with the identified expression. If a VCU that stores results for the identified expression is identified, then the process continues to step 412. If no VCUs are identified, then the process continues to step 414.

At step 412, database server instance 100 retrieves the evaluation results for the identified expression from one or more VCUs. In some cases, only a portion of the results may be cached due to memory constraints or due to row invalidations. In such cases, database server instance 100 may retrieve the portion of the results that are valid and cached within the one or more VCUs. For the portion that is not valid or cached, the expression is evaluated using values from a transaction journal, disk, or some other source. If the entire expression result is cached and valid, then the process may proceed without performing any evaluations for the identified expression.

If there are no VCUs that store results for the identified expression, then at step 414, database server instance 100 computes the PCRs. If the operand columns are stored in one or more column units within IMCUs 122*a* to 122*n*, then values for the operand columns may be retrieved from in-memory area 120 to perform the computation. If the values are not stored in memory, database server instance 100 retrieves the values from another source such as a transaction journal or disk.

At step 416, database server instance 100 determines whether there are any identified expressions that have not yet been evaluated. If so, then the process returns to step 410 and repeats steps 410 to 414 for the next identified expression. Once all identified expressions have been evaluated, then the process continues to step 418.

At step 418, database server instance 100 generates and returns a final query result using the PCRs, either retrieved from in-memory area 120 or computed per the description above, for each identified expression.

In-Memory Internal Units

As previously described, IMEUs 124*a* to 124*n* may be used to materialize PCRs and/or user-defined virtual columns within in-memory area 120 for subsequent reuse during scans, thereby providing faster query response times. Database server instance 100 further comprises IMIUs 126*a* to 126*n*, which materializes computations that are not suitable to be stored as VCUs, as described in further detail below. While database server instance 100 is depicted as having both IMEUs and IMIUs, in other implementations, a database server instance may comprise IMEUs but not IMIUs or IMIUs instead of IMEUs.

In an embodiment, each of IMIUs 126*a* to 126*n* are managed as an in-memory cache with fixed upper bound sizes that can be allocated on-demand on a per-IMCU basis. Similar to IMEUs 124*a* to 124*n*, IMIUs 126*a* to 126*n* store the results of internal computations. However, IMIUs 126*a* to 126*n* are structured differently than IMEUs and provide greater flexibility in the types of results that may be stored. As previously described, IMEUs store results as VCUs where the rows have a one-to-one relationship with CUs in the parent IMCU. This format facilitates transaction processing, as the VCUs may be treated as logically widening the table rows cached by the parent IMCU. Certain expressions, such as certain data conversions, hash operations, etc., may not have a one-to-one mapping with the rows cached by the parent IMCU. For such computations, the results may be stored instead in an IMIU. To organize the PCRs, IMIUs 126*a* to 126*n* maintain result maps that map computation identifiers to materialized results. Thus, IMIU 126*a* includes results map 138, which may be implemented as a hash table as described in further detail below. Similarly, IMIU 126*b* and 126*n* may include result maps to manage materialized computation results.

Figure 5:
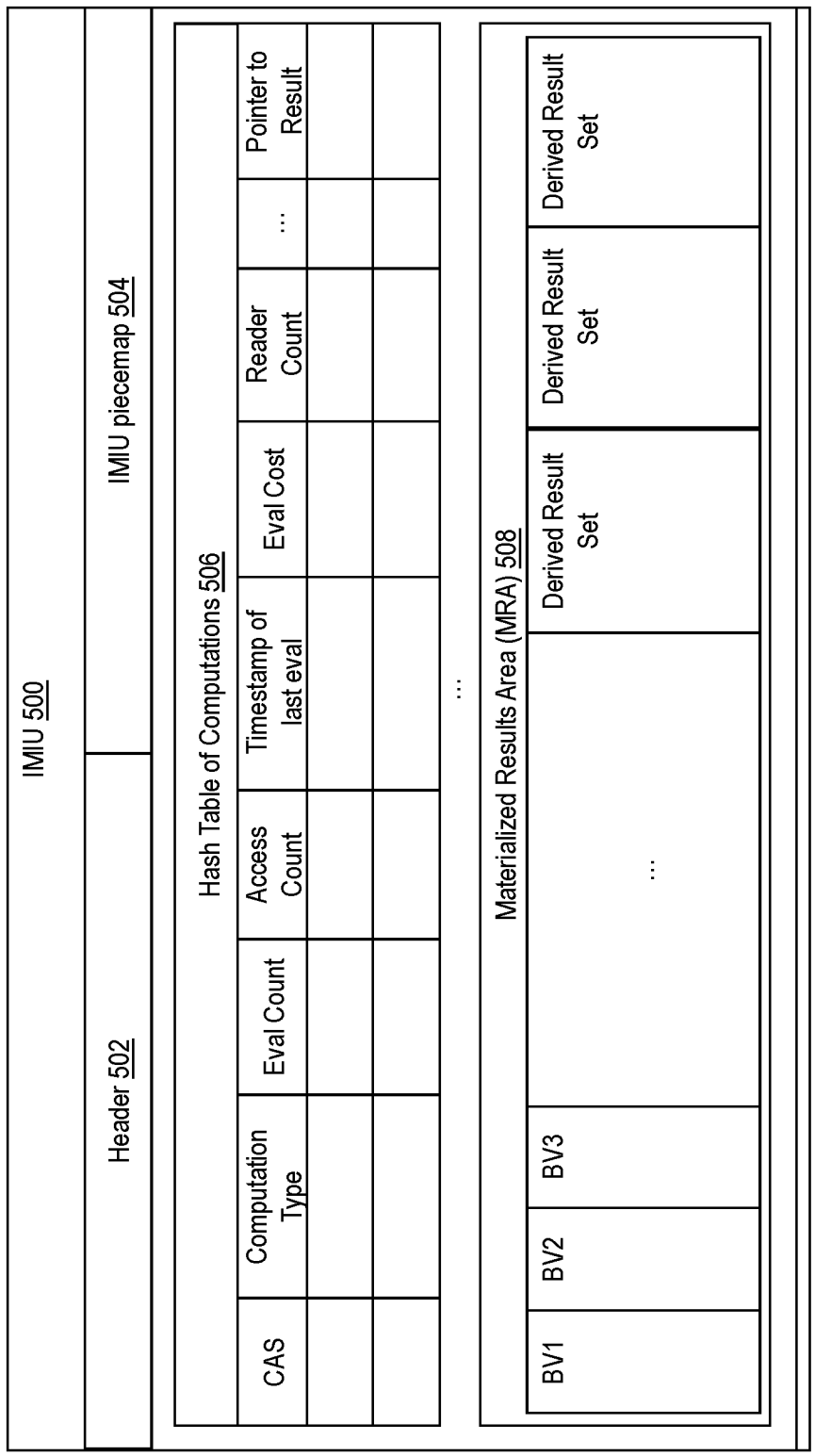
FIG. 5 is a block diagram depicting an example design for an in-memory internal unit, according to an embodiment.

FIG. 5 depicts an example design for an IMIU, according to an embodiment. IMIU 500 generally comprises header 502, IMIU piecemap 504, hash table of computations 506, and materialized results area (MRA) 508.

Header 502 stores information used to manage free space within IMIU 500. In an embodiment, header 502 may include, without limitation:
  A pointer to free space where bit-vector results should be stored (allocate forward);
  A pointer to free space where derived column results should be stored (allocate backward); and/or
  One or more values indicating the amount of available free space for either class (e.g., bit-vector, derived column) of PCRs.

Piecemap 504 stores an array of pointers to IMIU extension pieces, if any, that may be located in other areas of memory. If the head IMIU piece is completely consumed with materialized results, database server instance 100 may allocate more memory and construct a chain IMIU piece to store additional computations. Thus, the IMIU cache can grow or shrink in size.

Hash table of computations 506 tracks statistics about computations processed against the parent IMCU and, if materialized serves as an computation ID to result map, providing the pointer to the stored computation result in the IMIU. Each hash bucket within hash table of computations 506 may store information to facilitate internal computation tracking and lookups. This information may include, without limitation:
  A compare and Swap (CAS) value for handling concurrent accesses to the hash bucket;
  A type associated with the internal computation;
  A running evaluation count that tracks how many times the internal computation has been evaluated (computations that are pruned out do not affect this count value)
  A running access count that tracks how many times the internal computation is referenced/accessed (computations that are directed at the parent IMCU are counted regardless of whether they are pruned out)
  A timestamp identifying the last time the internal computation was last evaluated;
  A timestamp identifying the last time the internal computation was last accessed;
  A static cost associated with evaluating the internal computation;
  A running cost associated with evaluating the internal computation;
  A stored result pointer indicating a memory location where the results for the internal computation are stored; and
  A reader count to indicate how many processes are currently reading the hash bucket.

MRA 508 stores the results for internal computations. PCRs may store different classes of results including, without limitation, bit-vector results and derived column result sets. In one embodiment, bit-vector results are populated from the starting address of MRA 508 and allocated forward. Derived column or other result sets are populated from the end address of MRA 508 and allocated backward. Separating the result sets may help reduce fragmentation since bit-vector results may be managed in fixed sizes, allowing for bit-vectors to be replaced without causing gaps between result sets.

Computations to Materialize in IMIU

IMIUs 126*a* to 126*n* provide great flexibility in the type of computations that may be materialized within in-memory area 120. Due to this flexibility, the format of the results that are cached may vary depending on the particular type of computation that is materialized. Examples of PCRs may include, without limitation Bit-vectors derived during predicate evaluations;

Function evaluation results (such the results of a hash function, data type conversion, expression evaluations) on columns;

Concatenated columns for multi-column joins; and

Function evaluation results (such as data type conversions) on dictionary values, column numbers, and other metadata values.

A bit-vector that is derived during predicate evaluation stores a set of bits, where the position of each bit corresponds to a different row and the value of each bit indicates whether the corresponding row satisfies the predicate. If the predicate expression "e/f=10" is evaluated against five rows in table t, for example, then a five-bit bit-vector may be generated and cached in MRA 508 to indicate which rows of table t have values in columns e and f that satisfy the predicate expression. In the present example, the bit vector "10110" may be stored to indicate that the first, third, and fourth rows of table t satisfy the predicate, while the second and fifth rows do not satisfy the predicate. Caching bit-vectors allows subsequent queries to be rewritten to simply refer to the bit-vector rather than perform a potentially expensive evaluation.

Hash values are another internal computation result that may be valuable to cache. To illustrate, TABLE 2 depicts an example "what if" query that determines how much average yearly revenue would be lost if orders are no longer filled for small quantities of certain parts.

TABLE 2

SAMPLE QUERY WHERE HASH COMPUTATION MAY BE PERFORMED

| QUERY ID | QUERY |
| --- | --- |
| Q5 | select<br>    sum(l_extendedprice)/7.0 as avg_yearly<br>from<br>    lineitem ,part<br>where<br>    p_partkey = l_partkey<br>    and p_brand = 'BRAND23'<br>    and p_container = 'MED BOX'<br>    and l_quantity < (<br>        select<br>            0.2 * avg(l_quantity)<br>        from<br>            lineitem<br>        where<br>            l_partkey = p_partkey<br>    ); |

In Q5, "lineitem" is the fact table and "part" is a dimension table. The optimizer may pick a hash join to evaluate the query. When two tables are joined via a hash join, the dimension table is scanned and rows satisfying the where clause predicates for that table are used to create a hash table, based on the join key, in memory. Then the larger fact table is scanned and, for the rows that satisfy the where clause predicates for that table, the same hashing algorithm is performed on the join column. The join operation then probes the previously built hash table for each value and if there is a match, the row is returned. In some cases bloom filters may be used to perform the hash join operation. A bloom filter is a space-efficient probabilistic data structure that can be used to test whether an element is a member of a set or not. During the hash table creation for the dimension table, a bloom filter is also created based on the join column—the "p_partkey" column in the case of Q5. The bloom filter is then sent as an additional predicate to the scan of the "lineitem" table. After the "where" clause predicates have been applied to the "lineitem" table, the resultant row-set is further pruned by having the join column "(l_partkey)" hashed and probed in the bloom filter. If a match is found in the bloom vector, then that row is sent to the hash join operator. If no match is found then the row is discarded. Next, the passing rows from the fact table and dimension table are used to perform the actual join. This involves comparing the hash of the "l_partkey" for the passing rows from "lineitem", with the hash of "p_partkey" for the passing rows from "part", to weed out false positives from the bloom filter evaluation. The final set of rows is sent to an aggregator to perform a summation. Based on the foregoing, there is ample opportunity for hashing the values of the distinct dictionary entries of the join key columns and reusing them to improve join performance. For the rows that pass the predicates on the fact table "lineitem", a look-up is performed on the dictionary index of the join key column "l_partkey" to directly obtain the hash value from the materialized stream and use it to probe the bloom filter. This results in a significant speed-up for joins that have a dominant bloom filter evaluation cost because the cost of computing hash values during runtime may be completely eliminated. Further, hash values that are fixed in length (e.g., 8-bytes) may be cached as an aligned data stream within IMIU. By determining the start location where the stream of hash values are stored and accessing the stream directly the hash operation may be completed without looking up the dictionary symbols and their lengths.

An IMIU may also cache concatenated columns, according to an embodiment. TABLE 3 depicts an example query that may benefit from caching a concatenated column.

TABLE 3

SAMPLE QUERY WHERE COLUMN CONCATENTATION

| QUERY ID | QUERY |
| --- | --- |
| Q6 | select * from T1, T2 where T1.id = T2.id and T1.name = T2.name; |

Q6 effectively has two single column joins. Traditionally, rows are pruned out by performing a bloom filter operation on the first join operation (T1.id=T2.id), and subsequently, the second bloom filter operation (T1.name=T2.name) is performed on the passing rows from the first operation to prune out even more rows. As previously discussed, a single column join may be improved by materializing hash values of the join key columns in the IMIU. The same technique may be applied twice to Q6 to improve query performance. However, internally concatenating columns for each of the two tables involved in the multi-column join may improve query performance for analytic workload. For "T1", the internal column is "(IC1=T1.id o T1.name)", and for "T2", it is "(IC2=T2.id o T2.name)". With the concatenated column, the query may be rewritten internally to the following: "select * from T1, T2 where T1.IC1=T2.IC2". Thus, the original multi-column join query can be reduced to a single-column join query.

In an embodiment, IMIU may be used to cache decimal scaled binary (DSB) representations. A DSB representation comprises a DSB vector and DSB metadata. A DSB vector is an array of DSB values, which are native integers scaled by a common factor. The DSB metadata describes properties of the DSB vector and may include the following metadata:

The width of each array element;
An exponent indicating the number of base-100 digits to the right of the decimal point;
Minimum and maximum values of the array; and
A bit-vector indicating rows to ignore.

A DSB vector may be used to represent different values, such as dictionary values for columns that store fixed and floating-point numbers. An entry in the IMIU may be used to store the DSB vector and the associated metadata listed above. For an arithmetic computation (e.g., "a+b"), a list of values for "a" and "b" may be obtained by looking up the dictionary entries for each value. For a particular IMCU, the DSB values may or may not be present for dictionary values of columns "a" and "b". If they are present in the IMIU, the DSB values may be retrieved in lieu of the fixed or floating point column values. Query processing may be improved as arithmetic operations may be performed more quickly with DSB values since floating point instructions are not needed. DSB conversions may be cached not only for physical columns, but also for materialized expression columns. For example, if a virtual column "v" is equal to the sum of physical columns "a" and "b", then a DSB representation of the unique values of the column "v", which is potentially materialized in an IMEU, may be stored in an IMIU. Thus queries of the form "select A+B+C from table" can be rewritten to effectively perform "DSB(V)+DSB(C)", thus improving query response times. This is an example where the IMEU and IMIU can work together to improve execution of a single query.

Hashing Computations

The manner in which an internal computation is mapped to hash table of computations 506 may vary from implementation to implementation. Each internal computation can be hashed based on a PCODE representation of the computation, a predicate log tree of the computation, and/or some other unique representation of the internal computation. A PCODE representation of an internal computation, for instance, typically includes a) an opcode b) column operands (with a data type for the column in some cases), and c) constant operands (as length/value pairs). The hash value may be obtained by applying a hash function to a combination of values included in the PCODE representation. Some examples are:

HASH opcode, column 1, constant data, constant data length
HASH opcode, type, column 1

The hash operator may further combine hash values for two or more different representations to derive a hash value for a nested/complicated internal computation. For instance the following command computes a hash value based on a combination of hash values:

HASH opcode, hashval1, hashval2

To demonstrate the hashing of internal computations, the following multi-column predicate is given by way of example: "c=1 and e/f=10". In order to map this computation to the corresponding bucket within hash table of computations 506, the following sequence of commands may be executed: (1) HASH(EQ, c, 1); (2) HASH(EQ, HASH(DIV, e, f), 10); and (3) HASH(AND, hashval1, hashval2). The first command corresponds to a hash on the sub-expression c=1, and the resultant hash value is saved as "hashval1". The second command corresponds to a hash on the sub-expression "e/f=10", and the resultant hash value is saved as "hashval2". The third command evaluates the full predicate by applying a hash function to a combination of "hashval1" and "hashval2". The hash values for each expression and sub-expression map to corresponding hash buckets within hash table of computations 506 and may be used to perform lookups and updates of the computation information maintained therein.

Candidate Computations to Materialize in IMIU

In order to conserve memory, database server instance 100 may limit which internal computations are tracked and stored within the MRA for each IMIU. Database server instance 100 may employ a set of heuristics to build a set of selection criteria. Computations that satisfy the selection criteria and are deemed eligible for storage in the IMIU are henceforth referred to as "candidate computations". Factors that may be involved in the selection process may include, without limitation:

Frequency of evaluation;
Runtime costs of evaluation;
Memory footprint of the computation if materialized; and
Memory pressure experienced by the cache and/or the overall system.

Based on the selection criteria and the statistics stored in hash table of computations 506, each internal computation is given a score, according to an embodiment. If the score satisfies a threshold, then the internal computation is selected for materialization. If the score does not satisfy the threshold, then the computation results are not materialized within MRA 508. Even if not materialized within MRA 508, IMIU 500 may continue to track statistics for the internal computation within hash table of computations 506.

The manner in which scores are computed for candidate expression may vary depending on the particular implementation. For instance, the runtime cost of an expression used to compute a score may be based on the number of CPU cycles taken to evaluate the computation, the filter rate for the predicate as determined by the number of rows filtered divided by the number of rows evaluated, or some other measure of resource consumption directly tied to evaluating the internal computation. Generally, an internal computation may be scored higher as the runtime cost and frequency of evaluation increase and lower as these factors decrease.

The thresholds used to determine whether to materialize a candidate expression may also vary depending on various factors. As an example, the threshold may be different for different types of computations. For instance, as the memory pressure increases, the thresholds for materializing expressions may also increase. Further, predicates may have reduced thresholds owing to the relatively small memory footprint consumed by bit-vectors. In another example, thresholds between different types of predicates may vary. For instance a predicate result may subsume complex sub-predicate results with no additional cost, and caching predicate results may allow for greater opportunities for predicate reordering. On the other hand, if the constant value of the predicate changes, then the entire stored result becomes useless. These attributes may be factored in when setting the threshold score or otherwise selecting predicates and other computations for materialization.

The granularity with which candidate computations are selected for materialization may vary based on the type of computation, according to an embodiment. Some computations, such as predicate evaluations, may be selected on a per-IMCU basis. As an example, if a predicate of the form "col=<value>" is never evaluated against a particular IMCU because it is always pruned by min-max pruning, i.e. the specified value is not within the minimum and maximum value ranges of that column in the parent IMCU, then storing this predicate in an IMIU for the parent IMCU would be a waste of space. Thus, selections may be performed on a per-IMCU basis such that predicates are cached based on the likelihood that the predicate will be evaluated for the parent IMCU. Further, the predicate result may be materialized for column values in one IMCU but not for column values in another IMCU.

In other cases, computations may be performed on a per-table basis. For instance, hash values for a join key column and data conversion on a column are generally applied to all values within a column. If such a candidate computation is selected for materialization, the results may be cached for all IMCUs that cache data from the table column.

Materialization of Computations

Once a candidate computation is selected for materialization within IMIU 500, then the next task is to populate IMIU 500 with the computation result. In one embodiment, computation results are populated by a foreground process during query execution. By using a foreground process, computation results to materialize are readily available as they are computed as part of the evaluation process for the query triggering the materialization. In order to materialize the computation, a query process copies the computation result into MRA 508, adjusts the free space pointers in header 502, and updates, within hash table of internal computations 506, the result pointer in the hash table entry corresponding to this computation such that the result pointer maps to the beginning of the stored result in the MRA 508.

During materialization, if sufficient memory is not available to store the results, then another in-memory extent (a contiguous memory chunk) may be allocated for IMIU 500. The amount of memory allocated for the in-memory extent may be a default amount, selected based on the amount of memory consumed by results already stored in MRA 508, or determined based on some other criteria. Once allocated, the result is written into the new in-memory extent, and piecemap 504 is updated to show the chaining of the IMIU.

Once materialized, the results in MRA 508 may be accessed by subsequent queries. The PCODE representation or other representation of the computation may be hashed and probed in the hash table on a per-IMCU basis. If the result corresponding to the computation is present in MRA 508, a pointer to the result in MRA 508 is present as a separate entry in hash table of computations 506. If the pointer is present, queries may be rewritten to access the results directly from MRA 508 rather than performing the computation during query execution.

Evicting Computations

In order to free up space within IMIU 500, database server instance 100 may evict internal computation results from MRA 508. To select which computations to evict, database server instance 100 may use a set of one or more cache replacement policies to identify computations that have become "cold". Example cache replacement policies may include, without limitation, a least recently used (LRU) policy that evicts the least recently accessed or evaluated expression from memory, a least frequently used policy that evicts the computation that is least frequently evaluated or accessed, a random replacement policy that randomly selects a computation for eviction, a clock with adaptive replacements (CAR) policy that evicts results based on a virtual clock hand (iterator) indicating when a computation was last accessed, and score-based ranking that computes a score based on statistics maintained for the materialized computations and evicts the computation with the lowest score. Eviction of colder computations can either be done on the fly as new computations come in, or it may be done as part of a dedicated eviction pass in an attempt to reclaim space in the event of memory pressure.

When computation results are evicted from MRA 508, the result pointer is deleted from hash table of computations 506 and the free space pointer is updated in header 502 and/or piecemap 504 to reflect the newly allocated free space. The computation results may also be removed from MRA 508 or may remain and be overwritten by subsequent computation results.

Evicting bit-vector results may be performed with zero-fragmentation since the bit-vector sizes may be identical and any subsequent bit-vector materialization may replace the unoccupied space in IMIU 500. Eviction of other computations, however, may lead to fragmentation in IMIU 500 due to the variable sizes of such computations. To ameliorate this effect, a de-fragmentation pass may be performed where stored results in MRA 508 are shuffled around after an eviction to ensure optimal space utilization. The eviction pass may be performed by a dedicated background process to prevent foreground queries from suffering a drop in performance.

In the event of high memory pressure, database server instance 100 may evict entire an IMIU entirely from in-memory area 120. Once evicted, the in-memory extents allocated for that IMIU are freed back to the space layer, which may allocate those extents for different uses. High memory pressure may be detected as:

A high ratio of expressions in a hash table of computations to materialized results in the MRA;

An IMIU size exceeding a threshold level, which may be a configurable parameter; and Overall system memory availability being low.

Consistency Maintenance of IMIU

A computation materialized in IMIU 500 is based on the values stored in the parent IMCU. For computations that have one-to-one mappings with rows of the table, as is the case with predicate bit-vector results, the validity bit-vector maintained in the associated SMU may be used to identify which bits in the predicate bit-vector are stale. For instance, the bit-vector maintained in SMU 128*a* may be used as a mask against the predicate bit-vector results stored in MRA 136 to obtain correct results for rows that are valid in IMCU 122*a*.

However, MRA 136 may also store computations that do not have a one-to-one row mapping. For such computations, the manner in which validity is determined depends on the nature of the results being cached. As an example, if DSB values are cached within MRA 136 where the DSB values are for distinct entries of a column storing floating point numbers, then, during a scan of IMCU 122*a*, a process may obtain the DSB values for the dictionary entry for the valid rows from the materialized result. For invalid rows, the results are not accessed from IMIU 126*a*. Rather, a non-DSB encoding of the results may be used to evaluate the computation.

Concurrency Operations for IMIUs

A particular query process may have different roles when accessing data stored in IMIU 500. For instance, the query process may act in the following roles:

- A writer that updates statistics of a particular computation in hash table of computations 506;
- A reader that uses the materialized result from MRA 508 to obtain a final query result; and
- A writer that materializes a computation result in MRA 508 and/or evicts a computation already materialized in MRA 508.

Multiple processes with various roles may concurrently attempt to access an IMIU. In order to manage potential conflicts, database server instance 100 may implement a set of concurrency policies. Example concurrency policies may include, without limitation:

- Allowing two or more processes acting as readers to access, in parallel, different materialized results within MRA 508;
- Copying result pointers when multiple processes, acting as readers, attempt to access, in parallel, the same materialized results, whereby the stored result may be accessed in parallel;
- Preventing multiple processes from adding the same computation results to MRA 508;
- Serializing writes to MRA 508 when multiple processes attempt to materialize different computations concurrently;
- Preventing multiple processes from evicting the same computation from MRA 508;
- Preventing a process from evicting a materialized result from MRA 508 when there are existing readers on that computation;
- Serializing evictions of materialized computations when multiple processes are attempting to evict separate computations from MRA 508;
- Serializing updates to the statistics in the same hash table entry in hash table of computations 506 when multiple processes concurrently attempt to update the hash table entry; and
- Preventing a reader from accessing a results pointer when a separate process is writing to the result pointer field in the hash table entry.

Concurrency on the IMIU 500 is maintained by using atomic CAS operations, according to an embodiment. The default value of the CAS field in the hash table entry (e.g., "0") is set to indicate that the hash table entry is unlocked. When a process attempts to access the hash table entry, the process attempts to update the CAS value to its own process id in order to atomically lock access to the hash entry. An access to the hash table entry of a particular computation may be prevented until a CAS operation succeeds. Thus, updates to a particular hash table entry may be restricted to one process at a time.

Materializing new computations involves potentially changing free space pointers, obtaining new chained units and updating the piece map, and evicting colder computations. In order to maintain concurrency, a latching mechanism may be implemented to protect writes into MRA 508 whenever a new computation is being added. Even when latched, readers may still be permitted to read other computations by using the atomic CAS operations.

When evicting computations, concurrency may be maintained by checking for readers before the selected computation is evicted from MRA 508. If there is a reader using a particular materialized result, the result is not evicted until the reader count for the computation indicates that there are no longer any processes reading the computation results. The reader count value may be maintained by incrementing the value whenever there is a process using the particular materialized result. To decrement the reader count, the reader takes an atomic lock on the hash entry for the computation using CAS and updates the value. In this way, concurrency between a writer looking to evict a computation and a reader reading the result may be handled.

In some systems, it may be possible for a process to die when reading a computation result. If the reader count has already been bumped up, with the death of the process, there is a risk that the counter will not be decremented back down to 0 even though no active process is actually using the result. In such systems, a list of processes reading a particular computation result may be maintained in addition to the reader count. Thus, if a process wanting to evict a computation has waited a threshold period of time, the process may examine the list to see if any dead processes are present. If such a process is found, it is removed from the list and the reader count is appropriately decremented, thus allowing the eviction to proceed.

Example Dataflow for Managing an IMIU

Figure 6:
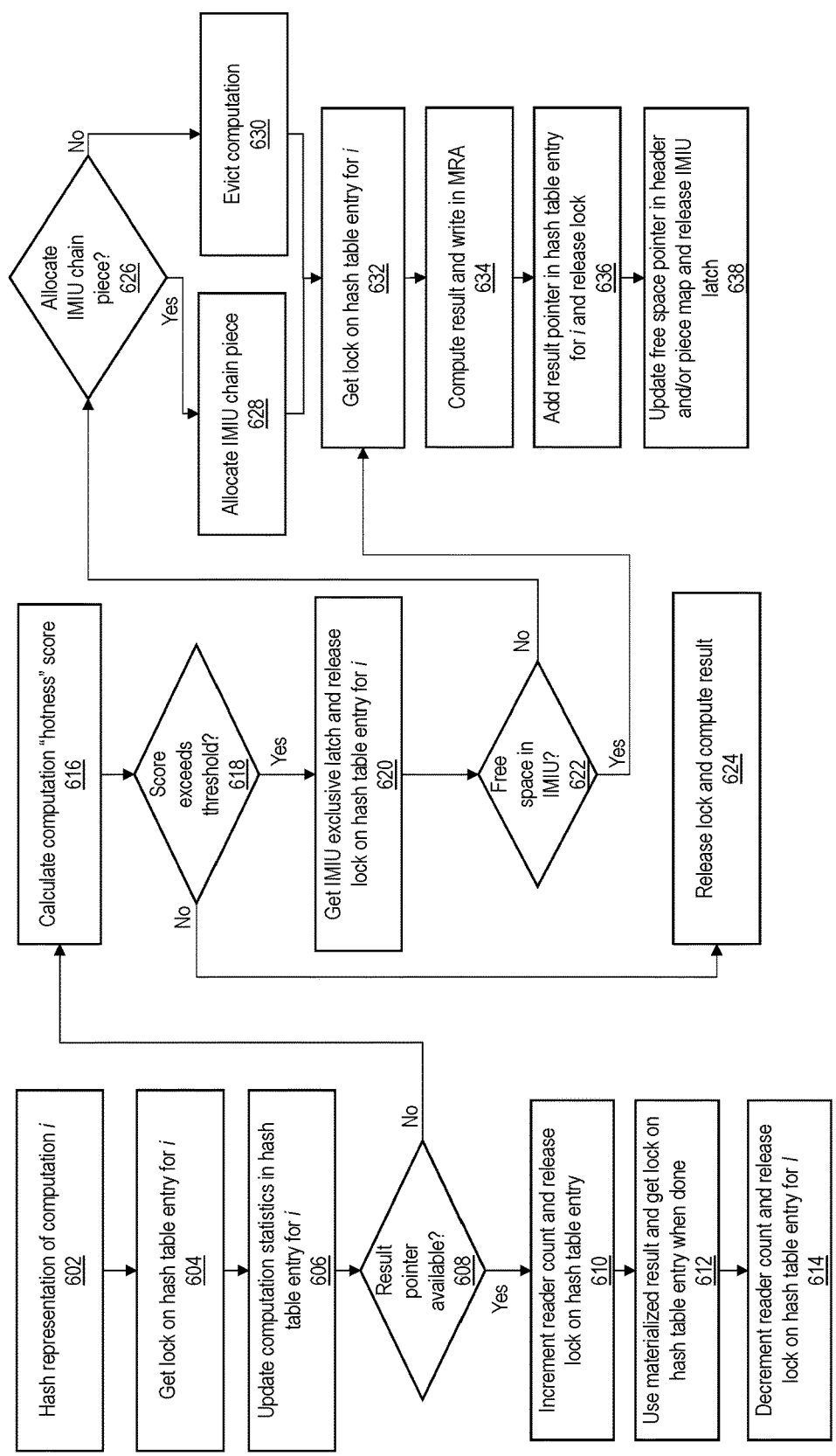
FIG. 6 is a flowchart depicting an example process for populating an in-memory internal unit with computation results and using materialized computation results to optimize query processing, according to an embodiment.

FIG. 6 is a flowchart depicting an example process for populating an in-memory internal unit with computation results and using materialized computation results to optimize query processing, according to an embodiment. In an embodiment, the process is performed by one or more foreground processes that belong to databases server instance 100. By using foreground processes IMIUs may be updated and populated during query executions as computations are being evaluated. Referring to FIG. 6, at step 602, a representation of a computation i is hashed. The hash may be applied to a PCODE representation, a predicate log, or some other computation representation as previously described. In response to hashing the computation representation, a hash value is generated that identifies a corresponding entry within hash table of computations 506.

At step 604, a lock is obtained on the hash table entry for i. A process may obtain a lock by updating the value within the CAS field of the hash table entry as previously described. Once locked, other processes are prevented from updating values within the entry. Other processes may concurrently update different entries within hash table of computations 506. However, a single hash table entry is updated by only one process at a time.

At step 606, computation statistics are updated in the hash entry for i. For example, the evaluation count, access count, timestamp of last evaluation, timestamp of last access, and evaluation cost statistics may be updated based on runtime information collected during query evaluation.

At step 608, the foreground process determines if the result pointer is available within the hash entry. If there is a result pointer stored in the hash entry, then the results for computation i are materialized in the MRA, and the process continues to step 610. Otherwise, if the pointer does not exits (e.g., it is set to NULL), then the result have not been materialized for the computation. Thus, the process continues to step 616.

At step 610, the foreground process increments the reader count and releases the lock for the hash table entry. The reader count indicates that the process is currently accessing the materialized result for computation i, thereby preventing other processes from evicting the computation. Other processes may update the hash table entry with the exception of the result pointer, however, as the lock on the hash table is released.

At step 612, the process reads the materialized result from the location in the MRA identified by the result pointer and uses the materialized result to compute a final query result. The computation of a final query result may involve multiple internal computations and expression evaluations. Thus, the process may check the IMIU and/or IMEU for other cached results to compute the final query result. Once the process has finished accessing the result from the MRA, the process obtains a lock again on the hash table entry for computation i.

At step 614, the process decrements the reader count to indicate that it is no longer accessing the computation result from the MRA. After the reader count is decremented, the process releases the lock on the hash entry for computation i.

If the computation results are not cached in the MRA, the process determines whether the results should be cached. Thus, at step 616, a "hotness" score is calculated based on the statistics maintained in the hash table entry for computation i. The manner in which the score is calculated may depend on a variety of factors, as previously described.

At step 618, the process determines if the score for computation i exceeds a threshold. If not, then the process continues to step 624. Otherwise, the process continues to step 620.

If the score for computation i does not exceed the threshold, then the results are not materialized. Thus, at step 624, the process releases the lock on the hash table entry for computation i thereby allowing other processes to modify the entry, and the process computes the computation results. In order to compute the computation results, the process may access the operand values from an IMCU, from a transaction journal, and/or from disk.

If the score for computation i exceeds the threshold, then the process begins the task of materializing the computation results within an IMIU. In step 620, the process obtains an IMIU exclusive latch and releases a lock on the hash table entry for computation i. The latch prevents other processes from updating the header, piecemap, and MRA in the IMIU.

At step 622, the process determines whether there is free space in the IMIU. If there is not enough free space in the IMIU to store the computation results, then the process continues to step 626 to either allocate or free up more space. Otherwise, the process continues to step 632.

At step 626, the process determines whether to allocate an IMIU chain piece. The determination of whether to allocate a new chain piece may be made based on a variety of factors, such as memory pressure, maximum size threshold for an IMIU, etc. If the process determines that an additional IMIU piece should be allocated, then the process continues to step 628. Otherwise the process continues to step 630.

If the process determines that another IMIU chain piece should be added to the IMIU, then at step 628, the process allocates an IMIU chain piece. The process may request a set of one or more in-memory extents from a space management layer, as previously described. Once allocated, the piecemap of the IMIU is updated to show the chaining of the IMIU.

If the process determines that another IMIU chain piece should not be allocated, then at step 630, the process evicts a computation to free up space in memory for the computation results. In order to evict a column, the process may first identify a "cold" computation to evict based on a replacement policy as previously described. If the reader count for the identified computation indicates that another process is currently accessing the computation, then the process may wait to evict the computation or select another cold computation to evict. If the reader count indicates the computation is not be accessed by another process, then the process removes the computation results from the MRA, deletes the result pointer from the hash table entry for the evicted computation, and releases the atomic lock for the hash table entry. The process also updates the free space pointers in the header and/or piece-map, if needed, to reflect the newly freed up space.

Once there is enough free space in the IMIU to materialize the computation results, the process obtains a lock on the hash table entry for i at step 632.

At step 634, the computation is evaluated to obtain the results, which are then written to the MRA. In order to compute the computation results, the process may access the operand values from an IMCU, from a transaction journal, and/or from disk At step 636, the process adds a result pointer in the hash table entry for i and release the lock. The pointer may identify the starting memory address where the computation results are stored within the MRA.

At step 638, the free space pointer in the header and/or piecemap of the IMIU is updated, if needed, and the IMIU latch is released. After this step, other processes may access and use the materialized computation results from the MRA. As various database queries are received and processed, the queries may be rewritten to access the results directly form the MRA rather than re-evaluating the computation another time.

In-Memory Statistics Store

The hash table of computations 506 tracks computations at a per-IMCU level as previously described. By tracking at this granular level, selections of which results to materialize may be performed at on an IMCU-basis. However, tracking on a per-IMCU basis involves a bit more overhead than tracking at a higher level of granularity, such as at a per-table basis. In addition, if the data is spread around uniformly among different IMCUs, the same computations may be evaluated across all IMCUs during query execution. Thus, in some instances, it may beneficial to track computation usage at a per-table level.

In order track computations at a per-table level, a dedicated area within in-memory area 120 may be created every time an in-memory database instance is started. The dedicated memory, herein referred to as an In-Memory Statistics Store (IMSS), is maintained separately from IMIUs 126a to 126n and is used to track computation statistics on a per table-basis. Thus, the IMSS may gather statistics for data stored across a plurality of IMCUs. Data within the IMSS may then be used to drive the allocation, population and maintenance of the IMIUs 126a to 126n.

The IMSS may contain a hash table of computations hashed by a computation id (predicate log trees or PCODE bytestream) and base table object identifier. Similar to the hash table in IMIUs 126a to 126n, the IMSS hash table may track several attributes for each computation, such as timestamp of last evaluation, running count of number of evaluations, average run-time evaluation cost, computation-specific metadata, etc. The IMSS may be rolled into ESS 150 and maintained as a single unit to form a more generic database statistics repository (DSR).

Similar concurrency control operations may be performed to avoid conflicts that may arise when multiple processes attempt to access the IMSS. The IMSS may be used in conjunction with the per-IMCU level tracking or may be implemented as an alternative to IMCU-level tracking. For instance, when a database server instance is initially started, IMCUs 122*a* to 122*n* and IMIUs 126*a* to 126*n* may be gradually built. During the build phase, the IMSS may act as the statistics repository for computations and can be used to boot-strap the hash table in IMIUs when the IMIUs become available. If, for any reason, the IMCU is unavailable (dropped or repopulated), statistics may continue to be tracked in the IMSS. These statistics may then be used to pre-populate the hash table in a new IMIU. The combination of the IMSS and hash table of computations may also be useful in the case of heavy analytics under memory pressure. Processes may begin tracking computations at a per-IMCU level, but end up reverting to table-level tracking as time progresses to reduce memory pressure.

Predicate Reordering

The results that are cached in the IMIU may be factored in to predicate reordering optimizations, according to an embodiment. A predicate that utilizes a cached predicate result may be moved for earlier evaluation to improve runtime performance in some instances. For example, if the predicates in the clause "where c=1 and d=2 and e/f=10" are evaluated in the order they appear in the database query, then the predicate "c=1" would be evaluated first, followed by "d=2" and finally "e/f=10". However, if the results of the predicate "e/f=10" are materialized in memory, then the predicates may be reordered such that "e/f=10" is evaluated (i.e., by fetching the expression result from the IMIU) before "c=1" and "d=2" are evaluated. If the predicate "e/f=10" also filters out a lot of rows, then the next two predicates are potentially evaluated against fewer number of rows.

Each predicate in a query may have a different degree of selectivity. For instance, one predicate may filter out a different number of rows than another predicate. While identifying predicate results to materialize in the IMIU, predicates may be selected based on selectivity to store the bit-vector results of highly selective predicates (high filter rate). During query execution, predicates may be reordered to evaluate the highly selective predicate, which has a higher likelihood of having cached results available in the IMIU. If cached, the results are obtained directly from the IMIU, thereby reducing the number of rows evaluated against the subsequent predicates. Thus, choosing high selective predicates to cache coupled with reordering of predicates may significantly improve query performance.

Additional Query Processing Optimizations

Materializing hot expressions or user-defined virtual columns in-memory in VCUs may improve scan performance by not only avoiding repeated expression evaluation, but also providing the scan engine with the ability to use vector processing techniques more efficiently. In systems that support vector processing, instructions may operate on data arrays referred to as vectors rather and is not limited to operating on a single data item per instruction. An example vector processing technique is referred to as single instruction, multiple data (SIMD) processing where a single instruction may cause the same operation to be performed on multiple data sets simultaneously.

Materialized IMEs may facilitate vector processing by allowing multi-column expressions evaluations to be treated as a single column expression evaluation. Once a process is operating on a single column, vectors may be formed more easily thereby reducing the number of memory and/or disk accesses. For example, with a single column unit materializing results of a multi-column expression, a single dictionary may be used to store all the column's distinct values. This reduces the number of gather operations and random memory references that are performed in comparison to when two dictionaries are involved in the operation.

To demonstrate how materialized expression can be more amenable to vector processing, consider a query that has a predicate "a+b=10". Both columns, "a" and "b" are separate column that have their own dictionaries, referred to herein as "D1" and "D2" respectively. If the expression is not materialized to a single virtual column, then during expression evaluation, for each row, "a+b" is computed for some symbol in D1 and some symbol in D2, prior to comparing that result to the value "10". In order to vectorize this operation without an IME, a first gather operation would be executed to retrieve N random symbols from D1 for column "a", and a second, separate gather operation to retrieve N random symbols from D2 for column "b". Then, a vector addition operation is performed using the two vectors of N symbols each to get the values of "a+b" for those N rows. Subsequently, the result of the addition operation is compared to a vector of N "10" values in it. The gather operation is very expensive, as random memory references are performed in the two dictionaries. Thus, the process of vectorizing a multi-column expression evaluation can be quite heavy. With an IME, the "a+b" expression may be materialized into a single VCU. Using the VCU, the equality predicate may be vectorized in a much more simple and efficient manner. For example, a single load may be performed to fetch N symbols in the data-stream without going through the dictionary and without performing a random memory access to obtain a symbol. Then, a single compare operation may be performed to compare that vector to a vector of N "10" values. The loads on the data-stream vector are done sequentially, and so, the hardware will pre-fetch its values in, thus, allowing the processor to operate near or at memory bandwidth speeds.

Hardware Overview

In some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
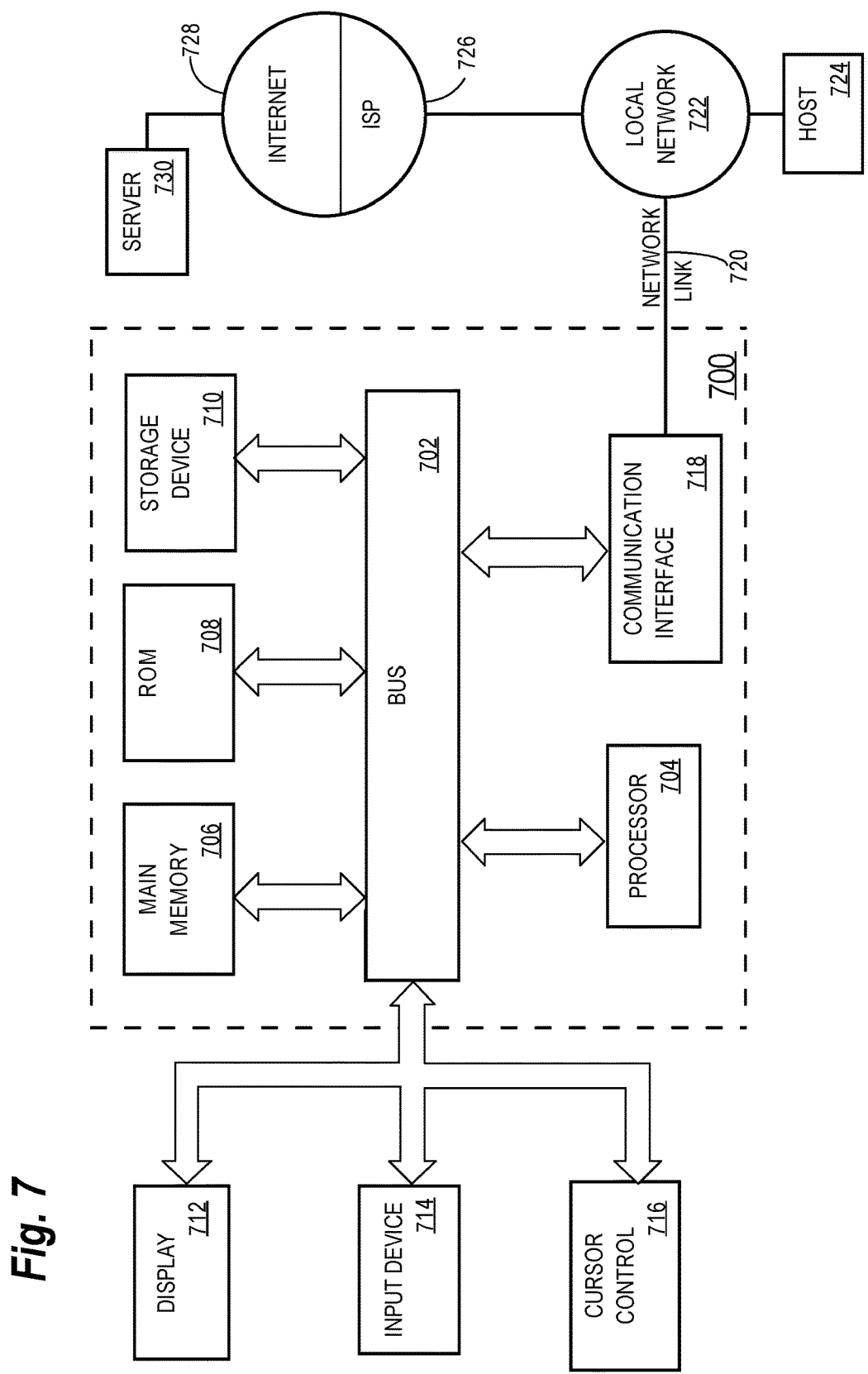
FIG. 7 is a block diagram that illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing, in volatile or non-volatile memory, a set of one or more column units;
    wherein the set of one or more column units correspond to one or more columns;

wherein each column unit of the set of one or more column units includes data items from the column to which the column unit corresponds;

wherein the one or more columns belong to one or more on-disk tables within a database managed by a database server instance;

wherein the set of one or more column units includes a particular column unit that corresponds to at least one particular column of a particular table within the database;

storing, in volatile or non-volatile memory, a set of one or more virtual column units;

wherein the set of one or more virtual column units includes a particular virtual column unit that stores results that are derived by evaluating an expression on the at least one particular column;

storing, in volatile or non-volatile memory, data that associates the set of one or more column units with the set of one or more virtual column units;

wherein the set of one or more column units belong to a first in-memory columnar unit;

wherein the set of one or more virtual column units belong to a first in-memory expression unit;

wherein the first in-memory columnar unit and the first in-memory expression unit correspond to a first set of rows from the one or more columns;

wherein the results stored in the particular virtual column unit are derived using values in the first set of rows from the at least one particular column;

wherein the first set of rows include a first row and a second row;

maintaining, within a shared metadata unit, data that indicates which rows in the first set of rows have become stale within both the first in-memory columnar unit and the first in-memory expression unit storing, in volatile or non-volatile memory, data that associates the shared metadata unit with the first in-memory columnar unit and the first in-memory expression unit;

in response to detecting an update to the first row, updating the data in the shared metadata unit to indicate that, within both the first in-memory columnar unit and the first in-memory expression unit, the first row has become stale;

after updating the data in the shared metadata unit, receiving a query that requires evaluation of the expression;

in response to receiving the query:
  based on the data in the shared metadata unit, determining that, within the first in-memory columnar unit and the first in-memory expression unit, the first row has become stale;
  responsive to determining that, within the first in-memory columnar unit and the first in-memory expression unit, the first row has become stale, evaluating the expression for the first row based on values obtained from a source other than the first in-memory columnar unit and the first in-memory expression unit;
  based on the data in the shared metadata unit, determining that, within the first in-memory columnar unit and the first in-memory expression unit, the second row is not stale; and
  responsive to determining that, within the first in-memory columnar unit and the first in-memory expression unit, the second row is not stale, obtaining results of the expression for the second row by reading cached results of the expression, for the second row, from the first in-memory expression unit.

2. The method of claim 1 further comprising maintaining, in volatile or non-volatile memory, an in-memory internal unit that stores pre-computed results that:
  are derived from values in the one or more columns; and
  do not have a one-to-one correspondence with rows of the one or more on-disk tables.

3. The method of claim 1,
  wherein the particular virtual column unit stores data for a particular virtual column;
  wherein the particular virtual column is defined using the expression; and
  wherein the particular virtual column does not correspond to an on-disk column.

4. The method of claim 1, the method further comprising:
  storing, in volatile or non-volatile memory, a second in-memory columnar unit and a second in-memory expression unit;
  wherein the second in-memory columnar unit and the second in-memory expression unit correspond to a second set of rows from the one or more columns;
  wherein the second in-memory columnar unit includes a second set of one or more column units corresponding to the one or more columns;
  wherein the second in-memory expression unit includes a second set of one or more virtual column units; and
  wherein the second set of one or more virtual column units includes a second virtual column unit stores results for the expression that are derived using values in the second set of rows from the at least one particular column.

5. The method of claim 1, further comprising:
  wherein the expression operates on the at least one particular column;
  wherein the query includes the expression that operates on the at least one particular column;
  in response to receiving the query, identifying, based on the data that associates the set of one or more column units with the set of one or more virtual column units, the particular virtual column unit; and
  rewriting the query to access the results stored in the particular virtual column unit rather than re-computing the results for the expression.

6. The method of claim 1, further comprising:
  receiving a query that includes a second expression that operates on at least one column of the one or more columns;
  wherein results for the second expression are not stored in the set of one or more virtual column units;
  in response to receiving the query, updating a set of statistics for the second expression during evaluation of the second expression;
  determining, based on the set of statistics updated during evaluation of the second expression, whether to materialize results for the second expression within volatile or non-volatile memory; and
  in response to determining to materialize results for the second expression, generating and storing, within volatile or non-volatile memory, at least one virtual column unit that includes results of evaluating the second expression.

7. The method of claim 1, further comprising:
  determining, based on a set of statistics maintained for the expression, that the results for the expression should be evicted from volatile or non-volatile memory; and in response to determining that the results should be evicted from volatile or non-volatile memory, removing the particular virtual column unit from volatile or non-volatile memory.

8. The method of claim 1, further comprising repopulating the set of one or more virtual column units in response to detecting that the set of one or more column units has been repopulated with data from the one or more columns.

9. The method of claim 1, wherein the results that are populated in the particular virtual column unit are computed from a set of data as the set of data existed when the set of one or more column units were populated; and wherein the results are populated in the particular virtual column unit by a background process.

10. One or more non-transitory computer-readable media storing instructions which, when executed by one or more processors, cause:
   storing, in volatile or non-volatile memory, a set of one or more column units;
   wherein the set of one or more column units correspond to one or more columns;
   wherein each column unit of the set of one or more column units includes data items from the column to which the column unit corresponds;
   wherein the one or more columns belong to one or more on-disk tables within a database managed by a database server instance;
   wherein the set of one or more column units includes a particular column unit that corresponds to at least one particular column of a particular table within the database;
   storing, in volatile or non-volatile memory, a set of one or more virtual column units;
   wherein the set of one or more virtual column units includes a particular virtual column unit that stores results that are derived by evaluating an expression on the at least one particular column;
   storing, in volatile or non-volatile memory, data that associates the set of one or more column units with the set of one or more virtual column units;
   wherein the set of one or more column units belong to a first in-memory columnar unit
   wherein the set of one or more virtual column units belong to a first in-memory expression unit;
   wherein the first in-memory columnar unit and the first in-memory expression unit correspond to a first set of rows from the one or more columns;
   wherein the results stored in the particular virtual column unit are derived using values in the first set of rows from the at least one particular column;
   wherein the first set of rows include a first row and a second row;
   maintaining, within a shared metadata unit, data that indicates which rows in the first set of rows have become stale within both the first in-memory columnar unit and the first in-memory expression unit;
   storing, in volatile or non-volatile memory, data that associates the shared metadata unit with the first in-memory columnar unit and the first in-memory expression unit;
   in response to detecting an update to the first row, updating the data in the shared metadata unit to indicate that, within both the first in-memory columnar unit and the first in-memory expression unit, the first row has become stale;
   after updating the data in the shared metadata unit, receiving a query that requires evaluation of the expression;
   in response to receiving the query:
      based on the data in the shared metadata unit, determining that, within the first in-memory columnar unit and the first in-memory expression unit, the first row has become stale;
      responsive to determining that, within the first in-memory columnar unit and the first in-memory expression unit, the first row has become stale, evaluating the expression for the first row based on values obtained from a source other than the first in-memory columnar unit and the first in-memory expression unit;
      based on the data in the shared metadata unit, determining that, within the first in-memory columnar unit and the first in-memory expression unit, the second row is not stale; and
      responsive to determining that, within the first in-memory columnar unit and the first in-memory expression unit, the second row is not stale, obtaining results of the expression for the second row by reading cached results of the expression, for the second row, from the first in-memory expression unit.

11. The one or more non-transitory computer-readable media of claim 10,
   wherein the particular virtual column unit stores data for a particular virtual column;
   wherein the particular virtual column is defined using the expression; and
   wherein the particular virtual column does not correspond to an on-disk column.

12. The one or more non-transitory computer-readable media of claim 10, wherein the instructions further cause:
   storing, in volatile or non-volatile memory, a second in-memory columnar unit and a second in-memory expression unit;
   wherein the second in-memory columnar unit and the second in-memory expression unit correspond to a second set of rows from the one or more columns;
   wherein the second in-memory columnar unit includes a second set of one or more column units corresponding to the one or more columns;
   wherein the second in-memory expression unit includes a second set of one or more virtual column units; and
   wherein the second set of one or more virtual column units includes a second virtual column unit stores results for the expression that are derived using values in the second set of rows from the at least one particular column.

13. The one or more non-transitory computer-readable media of claim 10, wherein the instructions further cause:
   wherein the expression operates on the at least one particular column;
   wherein the query includes the expression that operates on the at least one particular column;
   in response to receiving the query, identifying, based on the data that associates the set of one or more column units with the set of one or more virtual column units, the particular virtual column unit; and
   rewriting the query to access the results stored in the particular virtual column unit rather than re-computing the results for the expression.

14. The one or more non-transitory computer-readable media of claim 10, wherein the instructions further cause:

receiving a query that includes a second expression that operates on at least one column of the one or more columns;

wherein results for the second expression are not stored in the set of one or more virtual column units;

in response to receiving the query, updating a set of statistics for the second expression during evaluation of the second expression;

determining, based on the set of statistics updated during evaluation of the second expression, whether to materialize results for the second expression within volatile or non-volatile memory; and in response to determining to materialize results for the second expression, generating and storing, within volatile or non-volatile memory, at least one virtual column unit that includes results for the second expression.

15. The one or more non-transitory computer-readable media of claim 10, wherein the instructions further cause:

determining, based on a set of statistics maintained for the expression, that the results for the expression should be evicted from volatile or non-volatile memory; and in response to determining that the results should be evicted from volatile or non-volatile memory, removing the particular virtual column unit from volatile or non-volatile memory.

16. The one or more non-transitory computer-readable media of claim 10, wherein the instructions further cause repopulating the set of one or more virtual column units in response to detecting that the set of one or more column units has been repopulated with data from the one or more columns.

17. The one or more non-transitory computer-readable media of claim 10, wherein the results that are populated in the particular virtual column unit are computed from a set of data as the set of data existed when the set of one or more column units were populated; and wherein the results are populated in the particular virtual column unit by a background process.

* * * * *

UNITED STATES PATENT AND TRADEMARK OFFICE
CERTIFICATE OF CORRECTION

PATENT NO.         : 10,204,135 B2
APPLICATION NO.    : 15/146799
DATED              : February 12, 2019
INVENTOR(S)        : Mishra et al.

It is certified that error appears in the above-identified patent and that said Letters Patent is hereby corrected as shown below:

On the Title Page

On page 3, Column 2, item (56), under Other Publications, Line 35, delete "Subexpression" and insert -- Subexpressions --, therefor.

In the Specification

In Column 12, Line 24, delete ""a*b"" and insert -- "a*b". --, therefor.

In Column 12, Line 30, delete "that that" and insert -- that --, therefor.

In Column 26, Line 18, delete "disk" and insert -- disk. --, therefor.

In the Claims

In Column 33, Line 44, in Claim 10, delete "unit" and insert -- unit; --, therefor.

Signed and Sealed this
Twenty-eighth Day of January, 2020

Andrei Iancu
*Director of the United States Patent and Trademark Office*